(12) United States Patent
Foden et al.

(10) Patent No.: US 7,460,669 B2
(45) Date of Patent: Dec. 2, 2008

(54) ENCODING, DECODING AND COMMUNICATION METHOD AND APPARATUS

(75) Inventors: Clare Louise Foden, Cambridge (GB); Andrew James Shields, Cambridge (GB); David Mark Whittaker, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 862 days.

(21) Appl. No.: 09/983,700

(22) Filed: Oct. 25, 2001

(65) Prior Publication Data

US 2002/0097874 A1 Jul. 25, 2002

(30) Foreign Application Priority Data

Oct. 25, 2000 (GB) .................................... 0026141

(51) Int. Cl.
*H04L 9/00* (2006.01)

(52) U.S. Cl. ...................................................... 380/256
(58) Field of Classification Search ................. 380/256
See application file for complete search history.

(56) References Cited

U.S. PATENT DOCUMENTS

| | | | | |
|---|---|---|---|---|
| 5,307,410 A | * | 4/1994 | Bennett ....................... | 380/256 |
| 5,675,648 A | | 10/1997 | Townsend ..................... | 380/21 |
| 5,732,139 A | * | 3/1998 | Lo et al. ....................... | 380/28 |
| 5,757,912 A | | 5/1998 | Blow ........................... | 380/21 |
| 5,764,765 A | * | 6/1998 | Phoenix et al. ............. | 380/283 |
| 5,999,285 A | * | 12/1999 | Brandt et al. ................. | 398/212 |
| 6,289,104 B1 | * | 9/2001 | Patterson et al. ............ | 380/283 |
| 6,678,379 B1 | * | 1/2004 | Mayers et al. ............... | 380/278 |
| 6,778,669 B1 | * | 8/2004 | Lehureau ...................... | 380/256 |
| 2001/0055389 A1 | * | 12/2001 | Hughes et al. ................ | 380/44 |

FOREIGN PATENT DOCUMENTS

| | | |
|---|---|---|
| EP | 0 920 149 | 6/1999 |
| GB | 2 367 690 | 4/2002 |

OTHER PUBLICATIONS

Shimizu, Kaoru and Imoto, Nobutyuki, Single-photon-interface communication equivalent to Bell-state-basis cryptographic quantum communication, Jun. 26, 2000, Physical Review A, vol. 62, 054303.*

C. H. Bennett, Physical Review Letters, vol. 68, No. 21, pp. 3121-3124, "Quantum Cryptography Using Any Two Nonorthogonal States", May 25, 1992.

(Continued)

*Primary Examiner*—Ayaz Sheikh
*Assistant Examiner*—Saoussen Besrour
(74) *Attorney, Agent, or Firm*—Oblon, Spivak, McClelland, Maier & Neustadt, P.C.

(57) ABSTRACT

An encoding method, decoding method and a communication method using single photons where information is directly encoded into each photon. In one embodiment at least two out of the three parameters of phases, polarization, and energy are used to encode information. In another embodiment, three or more non-orthogonal states with respect to each parameter are used. A further embodiment is also described which uses selective grouping of the results in order to more clearly detect the presence of an eavesdropper. Apparatus capable of performing the methods are also provided.

55 Claims, 20 Drawing Sheets

OTHER PUBLICATIONS

W. Tittel, et al., Physical Review Letters, vol. 84, No. 20, pp. 4737-4740, "Quantum Cryptography Using Entangled Photons in Energy-Time Bell States", May 15, 2000.

S. N. Molotkov, Institute of Solid-State Physics, Russian Academy of Sciences, arXiv:quant-ph/9811038, pp. 1-9, "Quantum Cryptography Based on Photon "Frequency" States: Example of a Possible Realization", Nov. 16, 1998 (complete copy to be filed later).

C. H. Bennett, et al., International Conference on Computers, Systems and Signal Processing, pp. 175-179, "Quantum Cryptography: Public Key Distribution and Coin Tossing", Dec. 10-12, 1984.

J. Kim, et al., Letters to Nature, vol. 397, pp. 500-503, "A Single-Photon Turnstile Device", Feb. 11, 1999.

* cited by examiner

ENCODING, DECODING AND COMMUNICATION METHOD AND APPARATUS

FIELD OF THE INVENTION

The present invention relates to encoding, decoding and communication methods and apparatus. More specifically, the present invention relates to such methods and apparatus for encoding, decoding and for communicating a key for use in quantum communication and cryptography.

BACKGROUND OF THE INVENTION

There is often a need to communicate a message in secret over a channel which can potentially be intercepted by an eavesdropper. Traditionally, such a problem has been addressed by encrypting or enciphering the message using a secret key. The most secure classical encryption schemes generally take one of two forms. The most secure of all is a one-time pad since it cannot be decrypted mathematically. The cipher text is independent of the plain text. In a typical example of the one-time pad, each letter of the message is randomly encoded as another letter independent of whether the letter has already been used. Such an encryption key is preferably only used once. The weak link in such a scheme is that the transmitter of the message must find some way of securely sending the key to the receiver. Previous methods have relied on the use of trusted couriers, but this is obviously not practical in many cases. Other high security methods, such as DES and public key encryption methods such as RSA rely on the difficulty of finding the key and decrypting the message for their security. In these methods the eavesdropper has to try all possible ways to decrypt the message—a process which is too time consuming (or expensive to do). Quantum computers will be able to find the keys much more quickly. In DES, the sender and receiver also share a secret key. Therefore DES also suffers from the problem of how to communicate the key securely.

Quantum communication has gone a long way to addressing the problem of sending such a key. By encoding the key on a series of single photons, where each photon carries 1 bit of information encoded as quantum state of the photon e.g. polarisation, phase or energy/time of the photon an eavesdropper cannot intercept the key without at least partially changing the key. It is not possible to prevent an eavesdropper from obtaining the key, but he or she will be detected.

At present, there are two main protocols for communicating the key using single photons, these are BB84 (Bennett et al. Proceedings of the IEEE International Conference on Computers, Systems and Signal Processing, Bangalore, India (IEEE, New York 1984) p 175) and B92 (Bennett, Phys Rev. Lett, 68 3121 (1992)).

In BB84, the bit state 0 or 1 is encoded onto a quantum state of the photon, each bit (1 or 0) is doubly defined, this is done by using two bases each with 2 orthogonal states. One of the states in each basis codes for 0; the other codes for 1. The two states in each basis are orthogonal. The two bases are not orthogonal, therefore the states from one basis are not orthogonal to the states in the other basis. For example, for polarisation encoding one basis may be defined by vertical and horizontal basis states and the other basis is defined by two polarisation basis states at 45° to these states, i.e. at 45° and 135°, such that each polarisation state is orthogonal to the other state of the same basis.

The polarisation of each photon transmitted from sender to receiver is chosen to be in one of the four basis states. The polarisation for each photon is randomly chosen by the sender. The receiver measures the polarisation of each photon randomly switching between measurement basis.

When the receiver uses the same basis as a of the transmitter, the receiver should be able to measure the polarisation with a theoretical accuracy of 100%. However, since the states from the two bases are not orthogonal, and the overlap integral is a ½ (if the bases are offset by 45°), if the receiver uses the wrong basis, he has only a 50% chance of correctly measuring the polarisation, and a 50% chance of getting the wrong answer.

After the whole key has been sent, the receiver and transmitter will then communicate with one another over a classical (unjammable) channel. The receiver then tells the sender which measurement basis he used. The sender then tells the receiver which results to keep The results from any photon measured using an incorrect basis are then discarded. This means that, typically, the results from half of the measured photons will be discarded.

Generally, the transmitter is referred to as Alice, the receiver as Bob and an eavesdropper as Eve.

Eve listening into the signal could intercept some or all of the photons. Like Bob, she will not know which basis to use to measure the signals, so she may also randomly switch her measuring bases and will, on average, select the correct basis half of the time. If she intercepts a photon to make a measurement of its state, e.g. its polarisation, then she will destroy the photon. Therefore, to cover her tracks, she generates another photon with the polarisation and the basis in which she has just measured.

Thus, since on average, she will also be using the incorrect basis half the time, and therefore getting the wrong answer for the bit state a quarter of the time. Thus, she will send onto Bob photons in the polarisation in the wrong basis half the time, i.e. half the photons she transmits will be polarised in the wrong basis. This will result in errors for Bob. Assuming that she has intercepted all of the photons, she will have read half of them using the wrong basis and only stands a 50% chance of getting this half of the key correct. Thus, although Bob knows, after communicating with Alice, which measurements be made in the correct basis, one quarter of the results he keeps, and hence a quarter of the key will be wrong. This error can be checked for if Alice and Bob compare a part of key.

B92 will also be described using polarisation. However, phase of the photon can also be used here as well. In B92, each photon is sent having one of two distinct, non-orthogonal polarisation states where each state is a basis state from a pair of bases which are not orthogonal to one another. The receiver measures each of the transmitted photons randomly switching between one of two operators. The first of these two operators will annihilate the second of the two distinct non-orthogonal polarisation states. In other words, the first operator measures in the same basis as the second state.

The second of the operators will annihilate the first of the polarisaton states, as it is configured to measure in the same basis as the first polarisation state.

For example, if the state is a vertically polarised state en the second operator is a measurement of a horizontally polarised state. If the second state is oriented at 45° to the first state, then the first operator is a measurement of the state orthogonal to the second state, at 135°.

The transmitter and receiver then communicate and they discard the results where a positive result was not obtained. A positive result will only be obtained when the incorrect measuring basis was used. The choice of basis used to measure the polarisation is not disclosed in any of the communications.

The code is established by assigning a '0' to one basis and a '1' bit to the other basis. As for BB84, an eavesdropper will need to determine the polarisation of the intercepted photons and resend these to the receiver. There will be an error in the polarisation of the photons generated by Eve and this will again manifest itself as an error in the key established by Bob.

Although the above description has concentrated on the use of polarisation, it is also possible to use orthogonal phase states to encode the key.

The transmitted photons need to have a fixed polarisation, phase or energy, this can be done by generating the photons with a predetermined polarisation or by using an entangled polarisation stat technique, where the transmitter measures one photon of a pair of polarisation entangled or phase entangled or polarisation and phase entangled photons. Measuring the polarisation and/or phase of one of the entangled photons fixes the polarisation and/or phase of the other photon on route to the receiver. The generation of entangled photon pairs are described in Tittel et al, Phys. Rev. Letter 84, 4737 (2000).

In both BB84 and B92, if N photons are transmitted, then the results from N/2 photons will have to be discarded as these will have been measured using the wrong basis. Statistically about N/4 of the established key will be wrong if there is an eavesdropper eavesdropping every bit, in which case, the eavesdropper knows 50% of the key exactly, statistically the eavesdropper will know 75% of the key correctly.

SUMMARY OF THE INVENTION

The present invention attempts to improve the known protocols, by increasing the data rate of the key, and/or by increasing the error which Eve introduces when she intercepts the key and/or reducing the amount of the key which Eve can determine.

In a first aspect, the present invention provides a method of encoding information on a single photon, the method comprising the step of setting at least two parameters of the photon such that information is encoded onto the photon using the at least two parameters.

As previously mentioned the primary use of the method is for sending a key, the information encoded on the photon may be information which aids encryption of the key and/or the key itself.

Parameters can be quantum or classical. The parameters of polarisation phase and energy can be defined as quantum or classical parameters. Whether a parameter is used classically or as a quantum parameter is determined by how it is defined.

To define a parameter as a quantum parameter, at least two non-orthogonal bases with at least two orthogonal states per basis are used and the bit state is degenerately defined, Taking for example, the situation where here are two bases and two orthogonal states per basis, one state in each basis is assigned bit 0 state and the other in each basis is assigned bit 1 state. Thus, the states 0 and 1 are defined twice (once in each basis). The bases are non-orthogonal. Thus, the measurement basis must be chosen carefully in order to get the correct answer.

Polarisation and phase as quantum parameter have already been discussed. Energy/time can also be defined as a quantum parameter as described in S. N. Molotkov, arXiv. quant-ph/9811038 (1998) and Tittel et al, Phys. Rev. Letter 84,4737 (2000).

To define energy as a quantum parameter, one basis consists of two distinguishable energy levels and the second basis is formed from linear combinations of the two distinguishable energy levels or colours. The states in this second bases are time dependent, the states in the first bases are time independent. The first basis is generally referred to as the energy basis and the second basis as the time bases. To measure the states, either a time measurement or an energy measurement is preformed.

To define parameters as classical parameters, a degenerate definition of the states is not used. Instead one basis comprising of n orthogonal (or, strictly distinguishable) states. Thus, only one measurement basis is used to distinguish the states. Energy can be used as a classical parameter. The photon can have one of a plurality of different colours which can be distinguished. To avoid confusion, colour or wavelength will be used to refer to energy when it is used as a classical parameter and energy/time will be used to refer to energy as a quantum parameter.

Polarisation and phase can also be used as classical parameters. For example, win using polarisation as a classical parameter, only one basis will be used e.g., V H, by both the sender and the receiver. As a classical parameter can be accurately determined, the classical parameter cannot be used to determine the presence of an eavesdropper.

To summarise, to define a parameter as a quantum parameter, the state of the photon with respect to that parameter is chosen from m states in n non-orthogonal bases, where m is an integer of at least 2 and n is an integer of at least 1, to define a parameter as a classical parameter, the state of the photon with respect to that parameter is chosen from n orthogonal states in one basis.

One of the parameters, preferably a quantum parameter is chose from polarisation, phase or energy/time. In order to accurately measure a state defined by a quantum parameter, the basis of the states must be known. If an incorrect measurement basis is used, then there is a high probability of obtaining the wrong answer. The probability is related to the overlap integrals of the incorrect measurement basis with the correct measurement basis.

When phase is used, it needs to be defined as a relative phase. Phase encoding is achieved using an interferometer where a phase shift is introduced on one arm of the interferometer. The polarisation of a photon refers to the direction of its electric field vector, linear or circular polarisations may be used.

This quantum parameter may be used in accordance with the BB84 protocol wherein this parameter is set such that the photon occupies one of the four states $\psi_\alpha$, $\psi_\beta$, $\phi_\alpha$, and $\phi_\beta$, the four states forming two basis $\psi$ and $\phi$ such that:

$$(\psi_i|\psi_j)=(\phi_i|\phi_j)=\delta_{i,j}$$

wherein each of the indices i,j can be $\alpha$ or $\beta$.

Preferably, the basis is randomly chosen and the desired state within the chosen basis is determined in a random manner.

In the BB84 protocol, the bases preferably have the relation:

$$|\langle\psi_i|\phi_j\rangle|^2 = \frac{1}{2}$$

Although other overlap values are possible.

Alternatively, a quantum parameter may be used in accordance with the B92 protocol, where the parameter is set such that the photon occupies one of two distinct non-orthogonal states $|u_0\rangle$ and $|u_1\rangle$, wherein here exists operators $P_0=1-|u_1\rangle\langle u_1|$ and $P_1=1-|u_0\rangle\langle u_0|$ such that $P_0$ annihilates $|u_1\rangle$ and yields a positive result with probability $1-|\langle u_0|u_r\rangle|^2>0$ when applied to $|u_0\rangle$ and $P_1$ annihilates $|u_0\rangle$ and yields a positive result with a probability of $1-|\langle u_1|u_0\rangle|^2 > 0$ when applied to $u_1$.

Further quantum parameters may also be chosen from the phase or the polarisation or energy/time (depending on which one was chosen for the first parameter).

Second or third quantum parameters may also be used in accordance with either the BB84 protocol such that the photon also occupies one of the four states $\theta_\alpha$, $\theta_\beta$, $\chi_\alpha$ and $\chi_\beta$, the four states forming two basis $\theta$ and $\chi$ such that $$(\theta_i|\theta_j) = (\chi_i|\chi_j) = \delta_{i,j}$$

wherein each of the indices i,j can be $\alpha$ or $\beta$.

Alternatively, the second or third parameter may be chosen on accordance with the B92 protocol such that the photon also occupies one of two distinct non-orthogonal states $|w_0\rangle$ and $|w_1\rangle$, wherein there exists operators $R_0 = 1 - |w_1\rangle\langle w_1|$ and $R_1 = 1 - |w_0\rangle\langle w_0|$ such that $R_0$ annihilates $|w_1\rangle$ and yields a positive result with probability $1 - |\langle w_0|w_1\rangle|^2 > 0$ when applied to $|w_0\rangle$ and $R_1$ annihilates $|w_0\rangle$ and yields a positive result with a probability of $1 - |\langle w_1|w_0\rangle|^2 > 0$ when applied to $w_1$.

Using two quantum parameters to encode quantum information onto each photon allows a particularly secure way of transmitting information using single photons. Each photon will two quantum bits or 'qubits' of information. If both the phase and the polarisation are encoded using BB84, only results where the correct basis was used to measure both the phase and the polarisation is used should be kept.

This means that a quarter of the results from the measured photons will be retained. However this also me that, at most, the eavesdropper will also only use the correct bases for a quarter of the key. Also, even if the eavesdropper intercepts all of the photons, the error in Bob's results measured in the correct basis i.e. in the key will be greater than that when the photon only carries on qubit of information. Hence, Eve is easier to detect.

The first and second quantum parameters can both be encoded using BB84. However, one or both of the parameters could also be encoded using B92 to achieve the same advantageous effect.

Three quantum parameters, i.e. phase, polarisation and energy/time or any combination of two of these parameters could be used to encode information on a single photon.

It is also possible to use a classical parameter as the second parameter bit. For example, the wavelength or colour of the photon. The wavelength of the photon can be chosen from one or two or more predefined states. For example, in the simplest scenario, the photon could be encoded to have either the colour red or blue, where red codes for 0 and blue for 1.

In this example, with 2 colours, this technique allows 2 bits of information to be encoded onto each photon, one quantum bit or 'qubit' which is encoded using a quantum parameter and one classical bit which is encoded using the colour (wavelength).

It is possible to measure he wavelength of the photon using a dispersion element, such as a diffraction grating and single photon detector or a $\lambda$-sensitive single photon counter such as an STJ or a superconducting bolometer. As Eve can accurately determine the colour without affecting the result of Bob's colour measurement, the additional information carried by the classical bit does not improve the security of the transmission, but it does improve the bit rate carried by the photons as N photons now carry 2N bits for photons which are red or blue only, in this example.

The wavelength of the photon could be set to have one of p different values (colours). The only restriction on the upper limit of p is set by the number of colours which can be distinguished by the detector or detectors/grating combination.

In order to encode M classical bits of information, M possible distinguishable colours are required. If M bits are used, then the key length is (M+1) times the number of photons retained after Alice and Bob have discarded incorrect measurements. Thus, the transmission rate is (M+1) times faster.

Although the above has described colour as a classical parameter, phase and/or polarisation could also be defined as classical parameters. It is also possible to use two quantum parameters and one classical, or two classical parameters and one quantum parameter, or three classical parameters.

The above described encoding methods also have complementary decoding methods. Therefore, in a second aspect, the present invention provides a decoding method or decoding information from a single photon, the method comprising the step of measuring at least two parameters of the photon.

The preferred features of the decoding methods are complementary to those of the above described preferred features of the encoding method, The above encoding and decoding methods are primarily intended for use in a communication method. Therefore, in a third aspect, the present invention provides a communication method for communicating information between a first site and a second site using a stream of single photons, the method comprising the steps of:

a) encoding information at the first site on each photon of the stream of photons using at least two parameters, wherein at least one of the parameters is defined as a quantum parameter chosen such that the photon occupies one basis He with respect to that parameter, wherein the basis state is chosen from n bases which are non-orthogonal to one another and where n is an integer of at least two;

b) measuring the at least two parameters of the photons received at the second site wherein the quantum parameters are measured using a randomly chosen measurement basis from n non-orthogonal measurement bases, wherein each basis corresponds to a basis of step (a); and c) communicating between the first and second sites to establish which photons were measured using the correct basis.

The above method can be used for both BB84 and B92. In BB84, the basis state used to encode the photon is chosen from 2 bases with a choice of two states in each bases. In B92, the basis state used to encode the photon is chosen from 2 bases and only one state per basis can be chosen, In both BB84 and B92 Alice and Bob communicate to establish which photons were measured using the correct basis. In BB84, Bob tells Alice which bases he used and Alice tells Bob which results to keep, in B92 Bob tells Alice when he measured a photon or when he had a non-zero results. Thus, he is telling Alice which photons he measured using the wrong basis.

The photons can be encoded at the first site and sent to the second site, or an entangled photon pair method could be used.

The methods of the first to third aspects of the present invention also lend themselves to apparatus configured to perform them.

Therefore, in a fourth aspect, the present invention provides an encoding apparatus for encoding information on a photon, the apparatus comprising encoding means for variably setting at least two parameters such that information can be encoded onto the photon using the at least two parameters.

The encoding mean may comprise a polarisation rotator configured to rotate the plane of polarisation of a photon to one of a set of predetermined orientations and/or a phase modulator, configured to shift the phase of the photon by a phase shift chosen from a set of predetermined phase shifts and/or a photon generator capable of emitting a photon having one of at least two predetermined energy states. The source may be capable of just emitting photons having different colours or also be able to emit linear combinations of energy states such that energy/time can be used as a parameter.

A random number generator may be coupled to the polarisation rotator, phase modulator or photon generator to ensure that the encoding is random.

In a fifth aspect, the present invention provides a decoding apparatus for decoding information encoded on a single photon, the apparatus comprising measuring means for measuring at least two parameters of a photon.

The measuring means may comprise means to measure the polarisation of the photon such as a polarised and means to measure the phase such as an interferometer. The measurement basis is switchable as previously described. The decoder preferably comprises means to randomly switch the measurement basis.

In a sixth aspect, the present invention provides a communication apparatus comprising an encoding apparatus located at a first site for encoding information on a photon, the apparatus comprising encoding means for variably setting at least two parameters such that information can be encoded onto the photon using the at least two parameters;
  a decoding apparatus for decoding information encoded on a single photon, the apparatus comprising:
  measuring means for measuring the at least two parameters of a photon, located at a second site;
  a link configured to carry single photons to and from the first and second sites;
  a classical link between the first and second sites configured to carry classical information between the two sites,
  The classical link is preferably unjammable.

The photons may be encoded and sent from the first site to the second site. Alternatively, the photons my be generated as entangled photon pairs such that measuring the state of one photon of a pair serves to fix he state of the other photon of the pair (by collapsing its wavefunction), the apparatus being configured such that the first site receives one of the pair and the second site receives the other of the pair. The entangled state can be generated at first or second site or a third site remote from the first and second sites.

Previously, the method an eavesdropper might use to obtain knowledge about the key has been discussed where the eavesdropper has been trying to intercept the key by measuring every photon, and doing the same kind of measurements as Bob i.e. randomly selecting between measurement basis.

However, sometimes, the eavesdropper can be clever and make what is known as an "intermediate basis measurement". For example, when considering polarisation using BB84, the eavesdropper conventionally measures using one of two basis separated by an angle of 45°, exactly the bases tat Alice uses to send, and Bob uses to measure. Using this method, Eve has a probability of learning 50% of key exactly, 75% statistically (i.e. correct bits) of the key. However, if she fixes her basis to an intermediate basis which is interposed at an angle equidistant between the two bases chosen by Bob and Eve, Eve can potentially learn 85% of the key statistically i,e. approximately 85% of the key has the correct bits, whilst still using an error of only 25% in the established key.

To address this problem, in a seventh aspect, the present invention provides a method of encoding information on a photon, the method comprising the step of setting a parameter of the photon defined as a quantum parameter such that the photon can occupy a basis state chosen from at least three non-orthogonal bases with respect to that parameter.

The quantum parameters of polarisation, phase or energy/time may be used. More than one parameter can be set according to the above method.

Preferably, each state of the at least three non-orthogonal states are one state of pairs of states $\psi_\alpha$, $\psi_\beta$ such that:

$$\langle \psi_i | \psi_j \rangle = S_{ij}$$

wherein each the indices i,j can be $\alpha$ or $\beta$.

For example, where the parameter is polarisation of the photon, the polarisation state of the photon can be chosen from one of three basis, each basis having two orthogonal states, wherein each basis is offset by 30° from its nearest basis. Generally, if m non-orthogonal bases are used, each basis will be offset at 90°/m from its neighbouring bases.

Where the parameter is phase, the phase of the photon can be chosen from three basis states, wherein the first basis comprises two states having a phase of 0° and 180°, the second first basis comprises two states having a phase of 60° and 240° and the third basis comprises two states having a phase of 120° and 300°. Generally, if m non-orthogonal bases are used, each basis will be offset at 180°/m from its neighboring bases.

A further parameter chosen from the polarisation or phase of the photon (depending on the parameter already chosen) may also be set such that the photon occupies one of at least three non-orthogonal states with respect to this second parameter.

In addition to setting the polarisation and/or phase in accordance with the above, further information may also be encoded on the photon using the wavelength of X photon as previously described.

Any combination of classical and quantum parameters can be used.

In an eighth aspect, the present invention provides a decoding method for decoding information from a single photon, the method comprising the step of measuring at least one parameter defined as a quantum parameter by selecting one measurement basis from a choice of at least three bases which are non-orthogonal to one another.

In a ninth aspect the present invention provides a communication method for communicating information between a first site and a second site using a stream of single photons, the method comprising the steps of:
  a) encoding information at the first site on the photons by selectively setting a parameter of each photon defined as a quantum parameter such that the photon occupies one basis state with respect to that parameter, wherein the basis state is chosen from n non-orthogonal bases and n is an integer of at least tree;
  b) measuring the photons received at the second site wherein the quantum parameter is measured using a randomly chosen measurement basis from n non-orthogonal measurement bases, wherein each basis corresponds to a basis of step (a); and
  c) communicating between the first and second sites to establish for which photons the comet type of measurement was used.

The above may be achieved by sending photons from the first sit to the second site or vice versa. However, it is also possible to use entangled photon pairs to encode information onto the photons.

In a tenth aspect, the present invention provides an encoding apparatus for encoding information on a photon comprising:

encoding means configured to variably set a parameter defined as a quantum parameter such that the photon occupies one of at least three non-orthogonal states wit respect to the chosen parameter, The encoding means may comprise a polarisation rotator configured to rotate the plane of polarisation of a photon to one of a set of at least three non-orthogonal predetermined orientations and/or a phase modulator, configured to shift the phase of the photon by a phase shift chosen from a set of predetermined phase shifts. The apparatus may further comprise a random number generator such that the polarisation and/or phase of the photons is chosen on an at least partially random criterion.

The encoding means may also comprise a photon generator capable of emitting a photon having one of at least two predetermined or random wavelengths. The encoding means may also comprise means to emit a photon having one of at least two pre determined wavelengths and means to emit a linear time dependent combination of these energy levels corresponding to the two wavelengths.

In an eleventh aspect, the present invention provides a decoding apparatus for decoding apparatus for decoding information encoded on a single photon, wherein information is encoded onto the single photon by setting one parameter defined as a quantum parameter such that e photon occupies a basis state chosen from one of n non-orthogonal basis with respect to this parameter, where n is an integer of at least three, the apparatus comprising decoding means configured to measure the photons using a randomly chosen measuring bases from n basis which correspond to the bases use to encode the photon.

The decoding means may comprise means to measure the polarisation of the photon such as a polariser or polarising beam splitter and/or means to measure the phase of the photon such as an interferometer, or a means to measure the colour of the photon such as a dispersive element, colour sensitive, photon counter, etc.

In a twelfth aspect, the present invention provides a communication apparatus comprising:

an encoding apparatus located at a first site comprising encoding means configured to variably set a parameter defined as a quantum parameter such that the photon occupies a basis state chosen from one of n non-orthogonal basis with respect to this parameter, where n is an integer of at least three;

a decoding apparatus located at a second site comprising decoding means configured to measure the photons using a randomly chosen measuring bases from n basis which correspond to the bases used to encode the photon.

means configured to carry single photons; and a classical link between the first and second sites configured to car information between the two sites, The classical link is preferably unjammable.

The photons may be encoded and sent from the first site to the second site. Alternatively, the first site may be used to encode information on one photon state of an entangled photon pair, the other photon state being received at the second site.

In the sixth to twelfth aspects of the inventions the parameter which is defined as a quantum parameter may be chosen from polarisation, phase or time/energy. Two or even three quantum parameters may be used. The above method and apparatus may also be used where classical parameter(s) in addition to quantum parameter(s) are used.

In all of the above methods and those of the prior art, it is not possible to prevent Eve from eavesdropping. Instead, the security of the method relies on the fact that Eve can be detected.

In a thirteenth aspect, the present invention provides a communication method for communicating information between a first site and a second site using a steam of single photons, the method comprising the steps of encoding information at the first site on the photons by selectively setting a parameter defined as a quantum parameter of each photon such tat each photon occupies one basis state with respect to that parameter, wherein the basis state is chosen from n non-orthogonal bases and n is an integer of at least two;

b) measuring the photons received at the second site wherein the quantum parameter is measured using a randomly chosen measurement basis from n non-orthogonal measurement bases, wherein each basis corresponds to a basis of step (a);

c) grouping the measured photons into groups of m photons, d) communicating between the first and second sites to establish for which groups of photons the correct type of measurement was used for all photons in the group;

e) discarding the results from groups of photons which were not all correctly measured in step (b) and f) comparing both the type of measurement and the results of the measurement for all photons in at least one of the groups of photons, If information is encoded onto the photons using a protocol which is roughly based on that of BB84, then Alice and Bob communicate after Bob has received the photons to see which measurements were made by Bob using the correct basis. If Bob used an incorrect basis, then Alice cannot be sure that Bob obtained the correct bit state for the photon. Thus, these results are discarded.

In order to check for the presence of Eve, Alice and Bob then compare a part of the key, It Eve has intercepted and resent any of the photons, Bob's result could be wrong, even though he has used the correct basis, if he is using a BB84 type protocol. Thus, Alice and Bob compare both the measurement made and the results for part of the key.

Alternatively, information may be encoded using a protocol similar to that of B92 or the B92 protocol itself Here, Bob communicates which photons he measured to Alice. This is the same as establishing which photons were measured using the correct basis as in B92 only measurements which were made using an incorrect basis will be non-zero. The Key itself is established from the basis used. Thus, Alice and Bob need to compare the results obtained in order to check for Eve.

In the method of the thirteenth aspect of the present invention Alice and Bob do not simply establish a key from single photons) they establish a key from groups of photons. All photons in the group must be measured in the correct basis for the group to be kept otherwise it is discarded. They group together the results from single photons into groups of photons. The group is kept if all m are measured in the correct basis, otherwise it is discarded. They will only keep the established key if there is no error in the groups they use for error testing.

The value of M does not have to be constant along the stream of photons.

M can be established before or after the stream of photons has been sent to Bob. It is preferable to establish M after the stream of photons has been sent to Bob as this will prevent Eve from developing some clever strategy in order to mask her presence.

The quantum parameter may be chosen from polarisation, phase or energy/time.

The method of the thirteenth aspect of the present invention can be used in accordance with any of the above methods or apparatus where at least two parameters arc used to encode information on a photon or more than three non-orthogonal states are used.

BRIEF DESCRIPTION OF THE DRAWINGS

The present invention will now be described in more detail with reference to the following preferred non-limiting embodiments in which.

DETAILED DESCRIPTION OF INVENTION

Figure 1:
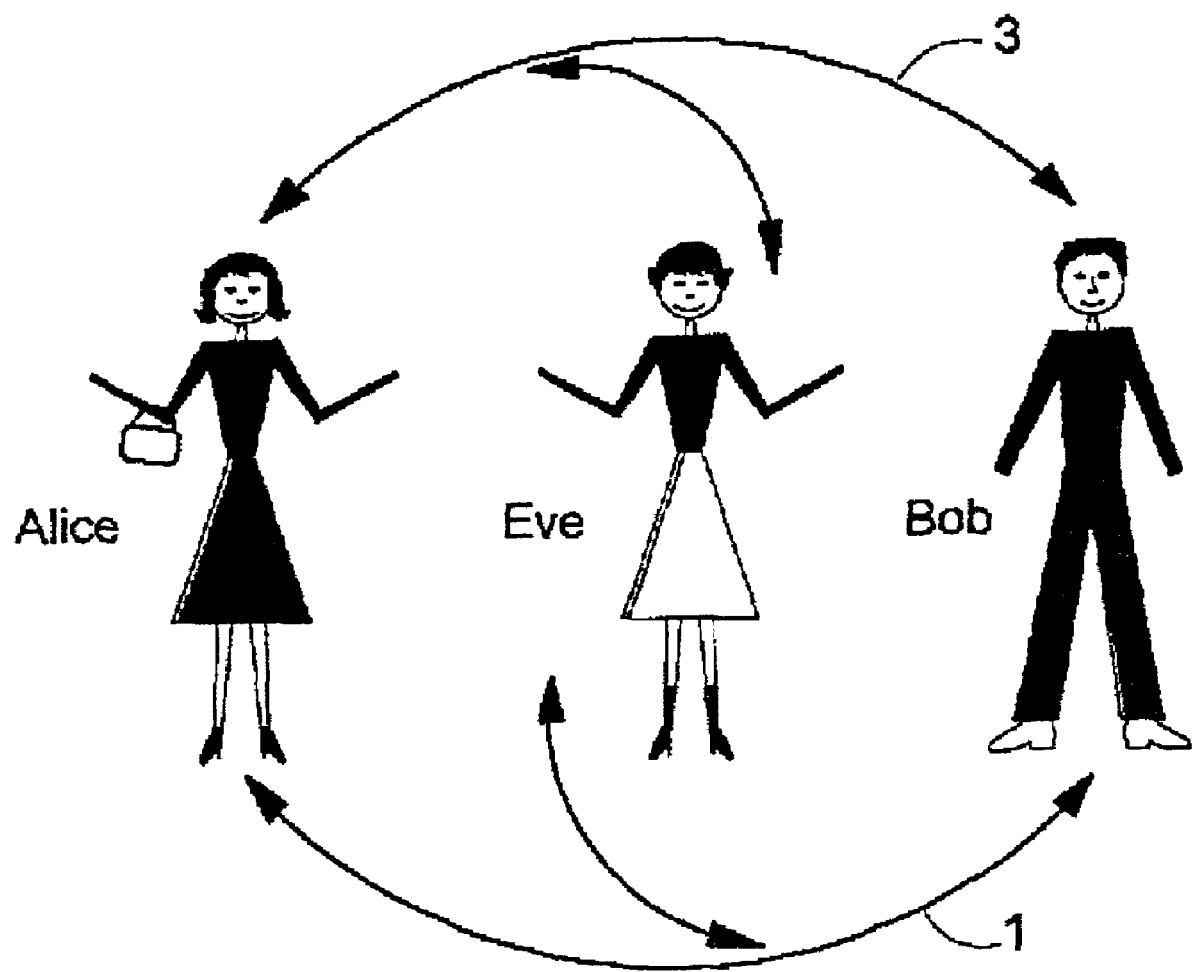
FIG. 1 is a schematic demonstrating the known problem of quantum communication from Alice to Bob with eavesdropper Eve.

FIG. 1 shows character Alice who is trying to send a message to Bob without eavesdropper Eve intercepting the message. Alice and Bob can communicate with each other by quantum communication channel e.g. an optical fibre 1 which can transmit single photons and classic unjammable communication channel such as a standard radio channel egg radio 4, newspapers etc. 3. Eve has apparatus which allows her to intercept a message on either of these two channels.

Alice first wants to send Bob a key. The key will later be used to encrypt and/or decrypt messages sent between Alice and Bob using any channel, e.g. phone, Internet, optical fibre, email, anything.

Figure 2:
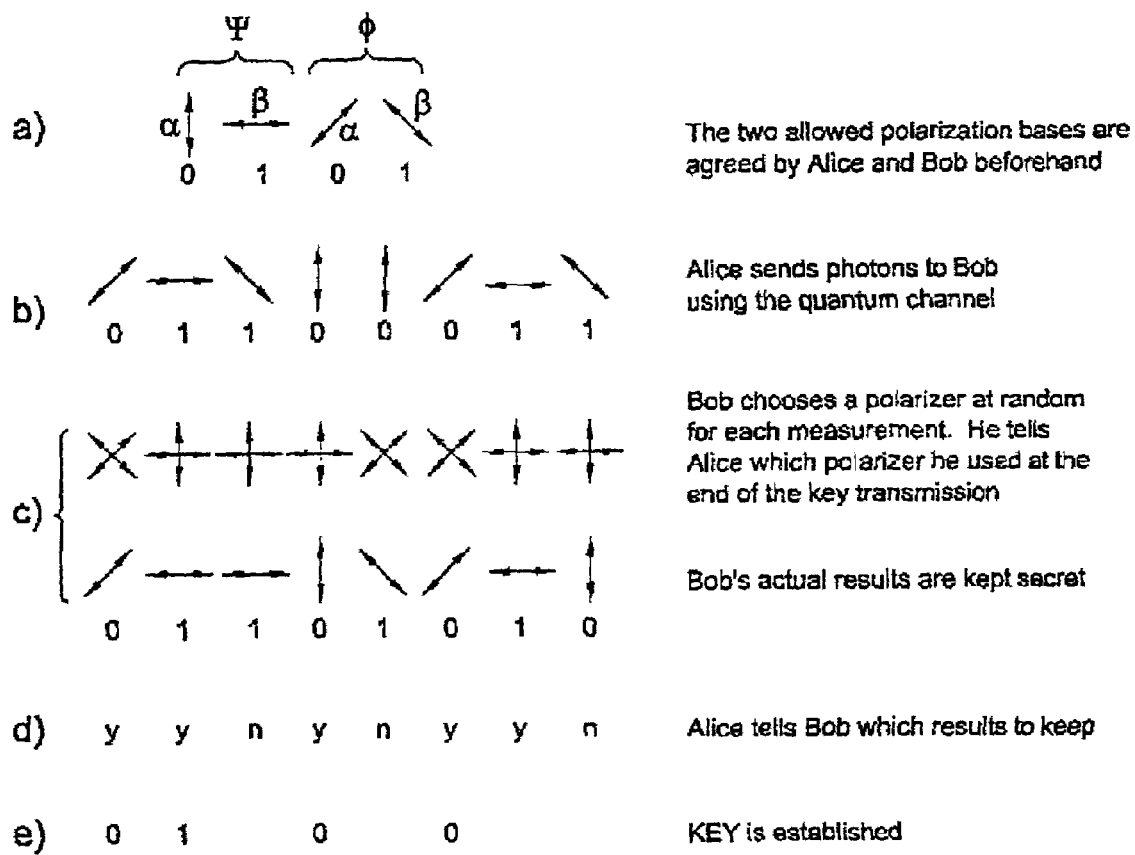
FIG. 2 is a schematic showing a series of steps used to establish the key in the BB84 protocol.

Alice and Bob agree that Alice should send a key encoded on single photons to Bob using quantum communication channel 1. Alice and Bob also agree that Alice will polarise the photon to have one of four polisation states. FIG. 2, step (a) shows the states which Alice and Bob intend to use. Alice uses two non-orthogonal bases $\psi$ and $\phi$, basis set $\phi$ is rotated through some angle from basis set $\psi$, this angle is conventionally 45°. However, other angles could be used providing that the bases are not oriented by 90° or an integer multiple of 90 from one another. There are two orthogonal states $\alpha$ and $\beta$ per basis. In this particular example, $\alpha$ will be used to code for bit 0 and $\beta$ will be used to code for bit 1.

In step (b) Alice sends the photons to Bob using the quantum channel. The basis set, i.e. $\psi$ or $\phi$, is chosen randomly. Also, whether it is the $\alpha$ or $\beta$ state of the $\psi$ or $\phi$ basis is also chosen randomly.

In step (c), Bob measures the polarisation of the photons randomly varying his measuring basis between $\psi$ or $\phi$.

If Bob chooses the correct basis, then the can distinguish state $\alpha$ from state $\beta$ with a theoretical accuracy of 100%. Errors can occur due to noise. However, if Bob uses the wrong basis, he will get the correct answer with a probability of a half, and the incorrect answer with a probability of a half for the case when there is an angle of 45° between the basis.

In step (d), Bob communicates with Alice on the classical channel and tells her which basis he used to measure each of the photons. However, he does not tell Alice his results. Bob also tells Alice which photons he received as some of the photons sent by Alice will not reach Bob. The problem of 'missing' photons is generally addressed by sending the stream of photons with a predetermined period between each photon. Thus, Bob knows when he should receive a photon so he can tell if a photon has been lost.

Alice then tells Bob over the non-secure classical channel 3 which results to keep (step (e)). Bob should only keep the results which were measured in the correct basis.

Bob's results measured in the incorrect basis are discarded and a key is established from the kept results.

Assuming that n photons were transmitted from Alice to Bob, approximately "/2 photons (or the results from those photons) r discarded, and n/2 kept.

Now that Bob and Alice agree on the key, they must check to see if Eve has eavesdropped the key.

Eve could intercept every photon sent by Alice, measure the state of the photon and then copy her result onto Bob to maximise her knowledge of the key. Prior to measurement, Eve would only know the two bases, ψ and φ, which are to be used. Therefore, like Bob, she could randomly change the basis of her polarisation measurements, or she would fix her measurement basis throughout, or she could switch between bases ψ with a probability of p and φ with a probability of 1–p. Eve can choose her tactic according to what Bob and Alice are doing.

If Eve uses basis ψ 50% of the time and basis φ 50% of the time, then, like Bob, she would expect to get the basis right 50% of the time for fixed basis/random switching. Therefore, the key which Eve transmits to Bob will have an error rate of approximately 50% in basis, as Eve will only measure half the key using the correct basis. If she measures the key in the wrong basis, and copies her result on to Bob, and he makes measurement in correct basis, he has approximately a 50:50 chance of correct answers Thus, by eavesdropping in this way Eve introduces errors at a rate of approximately 25% into established key.

In order for Bob and Alice to check for Eve's presence, they need to compare a part of their established or agreed key i.e. after they have discarded approximately 50%. If there are errors which are greater than the noise error rate in the quantum channel 1 (FIG. 1) in their keys then Alice and Bob know that Eve has intercepted the key. Thus, they must repeat the procedure preferably using a different quantum channel.

The above procedure is commonly called the BB84 protocol.

Figure 3:
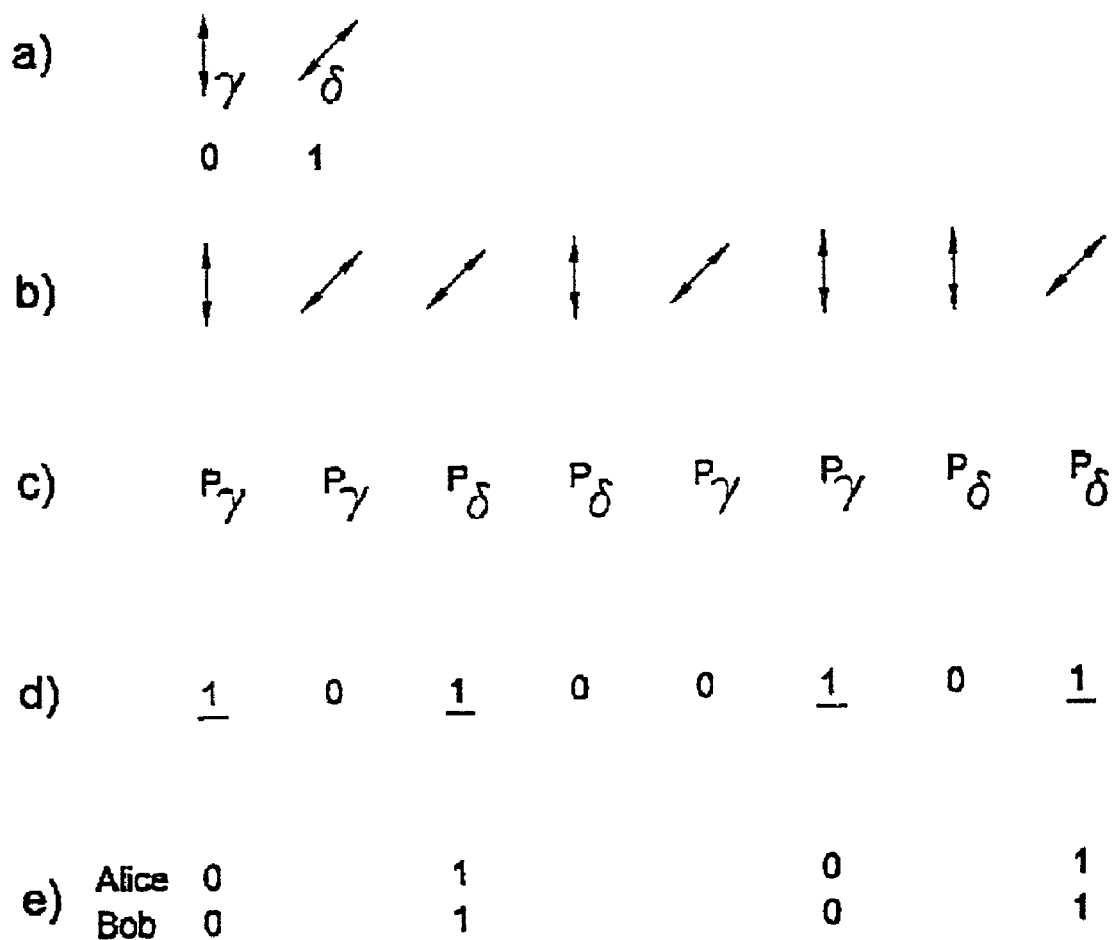
FIG. 3 is a schematic showing a series of steps used to establish the key in the B92 protocol.

FIG. 3 demonstrates the main steps of another procedure which Alice and Bob can use to transmit the quantum key. This procedure is commonly called the B92 protocol, Alice and Bob agree that Alice will send the key to Bob over quantum communication channel 1 using one of two non-orthogonal states γ and δ as shown schematically in step (a). In this example, γ will be 0 and δ is used to indicate 1.

Alice sends the key to Bob in step (b). Bob receives the stream of 8 photons sent in step (b) and measures them using either an operator $P_\gamma$ or $P_\delta$. If $P_\gamma$ is used to measure polarisation state δ then a zero result will be achieved and no photon count will be measured by Bob's detector. When $P_\delta$ is used to measure state γ then a zero result is achieved and again, no photon count is measured by Bob's detector. Non-zero results (and hence a count in Bob's detector) are only achieved when $P_\gamma$ is used to measure state γ and $P_\delta$ is used to measure state δ.

To clarify, γ is one basis state in an orthogonal basis. $P_\delta$ is a measurement of the state in that basis which is orthogonal to γ. For example, if γ is thought of as being a horizontally polarised state, then operator $P_\delta$ measures tee corresponding vertically polarised state of that basis. State δ and operator $P_\gamma$ have the same relationship as γ and $P_\delta$.

Therefore, Bob will achieve the results shown in step d of FIG. 2. Please note that a zero result (i.e. no detector count) has been shown as zero and non-zero results are shown as 1. If Bob has a positive result, i.e. he detects a photon, then he knows which state has been sent, and which basis was used. Bob's detector will also not register a count when a photon has been lost on route from the sender.

In step e, Bob tells Alice when his detector registered a count (i.e. when Bob had a positive result). Bob wants Alice to keep all of the positive results and to throw away the results where he had no count on his detector. Using $P_\gamma$ as zero ad $P_\delta$ as 1, it can be seen in point (e) that Alice and Bob's key agrees.

The error calculations for this protocol and the influence of Eve is the same as that described with reference to the description of BB84 above.

Both BB84 and B92 have been described using the polarisation of the photons. However, it is also possible to use energy or phase.

Figure 4:
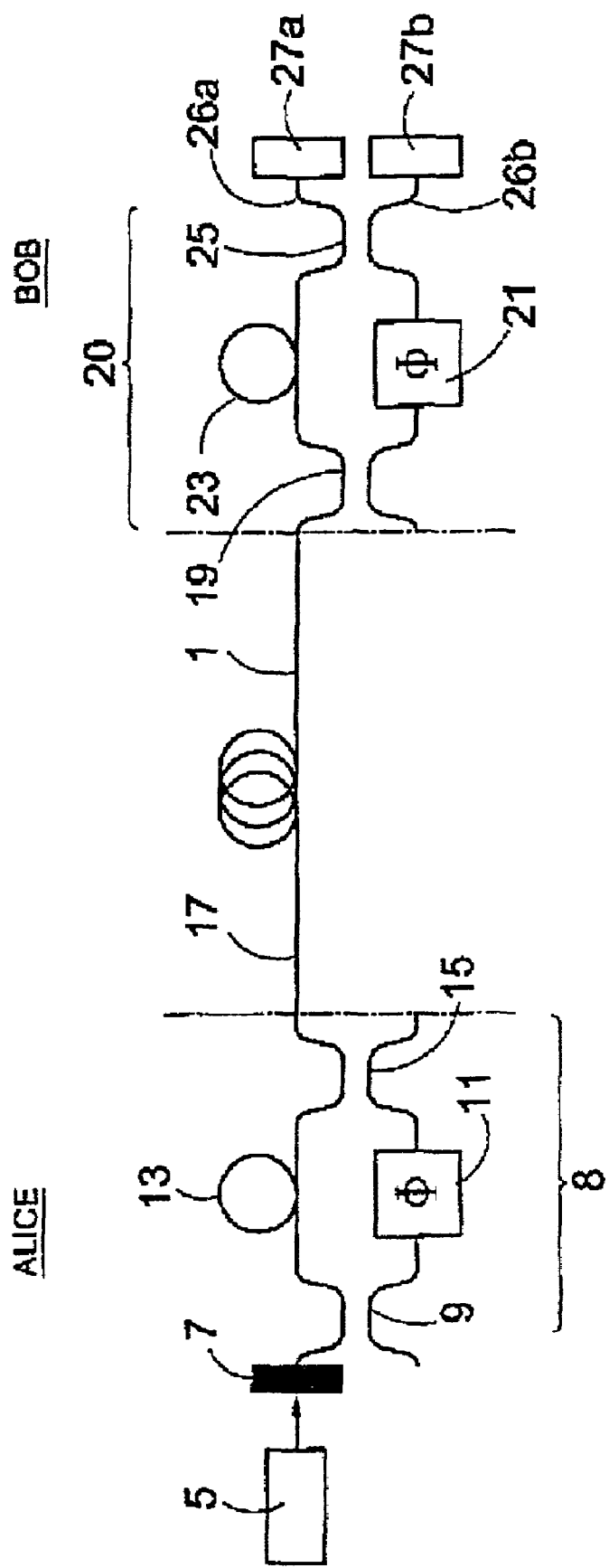
FIG. 4 is a schematic of a known apparatus used to encode and decode phase information on a single photon.

Energy eigen states of the photons can be used to code bit 0 or bit 1 onto the photon. In BB84, a first basis can be formed from two orthogonal eigen states and a second basis can be formed from two orthogonal state which are both linear combinations (superposed states) from the first basis. The second basis therefore has states which we not eigen states, they are time dependent states. Thus, in the same manner as described for polarisation, Alice can randomly vary the basis to code bits onto the photons and Bob must measure using the correct basis to ensure that he has correctly measured the bit coded on the photon, FIG. 4 shows an apparatus for transmitting the key on a stream of single photons from Alice to Bob where phase is used to code bits on the photons.

Alice is the transmitter of the signal. She transmits the signal to Bob along optical fibre link 1. Alice's transmitter has pulsed laser diode 5 which emits pulses of radiation into attenuator 7. Attenuator 7 strongly attenuates the beam such that there is less than 1 photon in each pulse. Alternatively, a dedicated single photon source could be used such as that described in unpublished UK application number 9927690.9, J, Kim et al in Nature 397 500 (1999) and Foden et al. Phys. Rev. A. 62 011803 (R) (2000).

The strongly attenuated pulsed beam is then fed into interferometer 8. In interferometer 8, fibre optic beam splitter 9 splits the optical path into two, a first lower short path which includes phase modulator 11 and a second upper long pat which includes delay loop 13. The two optical pats are then combined by beam coupler 15.

Phase modulator 11 is connected to a random number generator (not shown). In this example, which uses the BB84 protocol, the random number generator will randomly choose the phase to be one of 0°, 90°, 180° and 270°, The signal from beam combiner 15 is sent down fibre optic cable 17 towards Bob's receiver. The time delay introduced by delay loop 13 is chosen such that the signal from different optical paths can be distinguished at Bob's receiver.

The receiver comprises an interferometer 20 which is substantially identical to interferometer 8 on Alice's transmitter. On entering the receiver, fibre optic beam splitter 19 splits the optical path into two, a first lower shorter path which includes phase modulator 21 and a second upper longer path which includes delay loop 23.

Phase modulator 21 is again connected to a random number generator which chooses the phase shift to be 0° or 90°, i.e. it randomly changes the measuring basis.

The first and second optical paths of the receiver are then combined by fibre optic beam coupler 25. Three signals arrive at the beam coupler 25 for each pulse emitted from the pulsed diode laser as the photon follows one of four paths and two of the paths have the same path length. There will be a signal due to transmission along an optical path which encompasses phase modulator 11 in the transmitter and phase modulator 21 in the receiver, a path which encompass one delay loop (either 13 or 23) and one phase modulator (either 11 or 21) and a path which includes both delay loops 13 and 23.

Only the signal which arises from optical paths which have passed once through a delay loop (either 13 or 23) and once through a phase modulator (either 11 or 21) are of interest as these two paths interfere. Beam coupler/splitter 25 is configured to direct the photon down branch 26a if the phase of the photon constructively interferes with itself and to direct the signal down path 26b if the phase of the photon destructively interferes with itself.

A photon sent down branch 26a will be detected by single photon detector 27a and a photon sent down branch 26b will be detected by single photon detector 27b.

The single photon detector could be a photomultiplier tube, single photon avalanche photo-diode or a detector of the type described in unpublished UK patent application number 0018751.8.

If Alice codes the photon using one of orthogonal basis states 0° or 180°, and Bob's phase modulator introduces a phase shift of 0°, then Bob can determine the phase shift added by Alice with a 100% theoretical accuracy, as detector 27a will register a count if Alice's phase shift is zero and detector 27b will register a count if Alice's phase shift was 180°. However, if Bob uses a phase shift of 90°, then there is a 50% chance that the photon will register a count at detector 27a and a 50% chance that the photon will register a count at detector 27b.

Thus, in the way that the polarisation encoding was performed using two polarisation bases differing by 45° from each other, and the receiver comparing with the transmitter to check that the measurement has been performed in the right basis, the analogous situation can be seen here where results measured where the sender and receiver had a 90° phase shift can be discarded. The apparatus of FIG. 4 can also be used to code photons in accordance with the B92 protocol.

Figure 5:
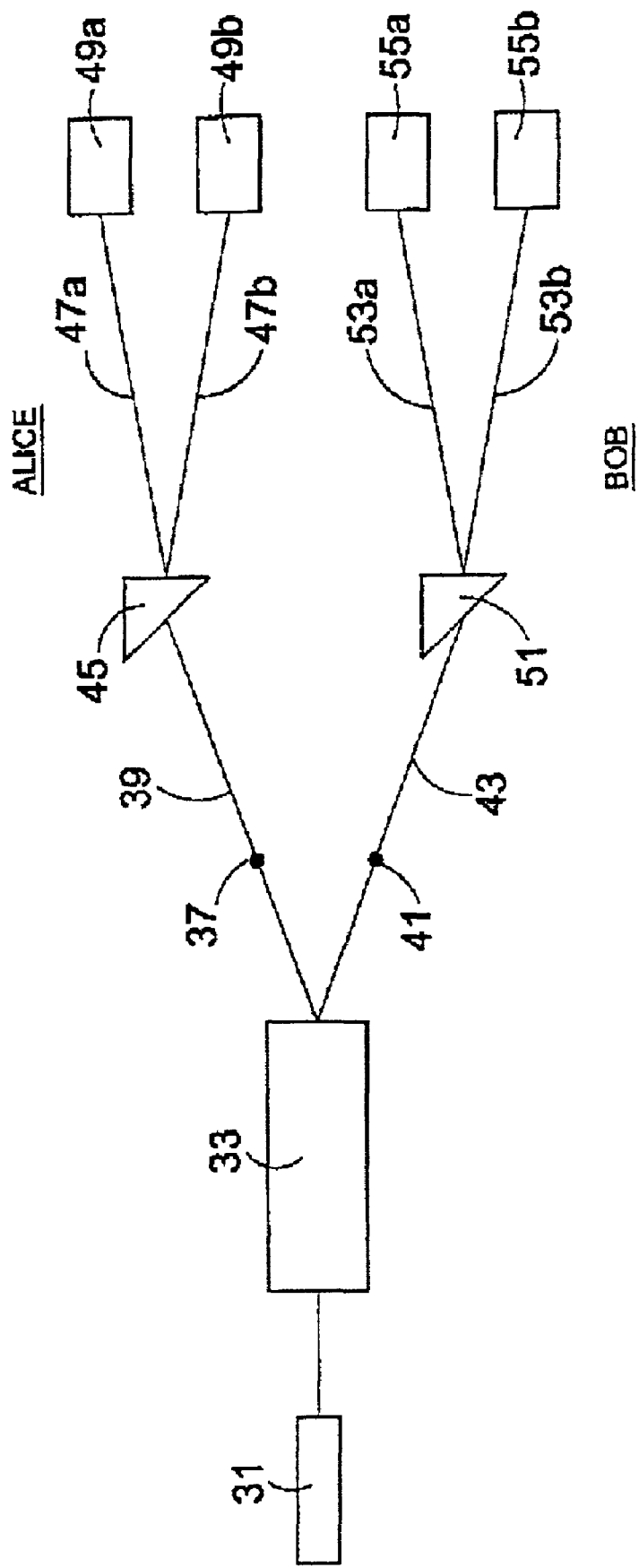
FIG. 5 shows a variation on the apparatus of FIG. 4 using the known method of polarisation entangled photon pairs to establish a key.

FIG. 5 shows a known type of apparatus for quantum communication. Here, polarisation-entangled two-photon states are generated. In this example, a polarisation entangled two-photon state is generated. Using the notation of FIG. 2, the entangled state could take the form:

$$\frac{1}{\sqrt{2}}\{(|\psi_\alpha\rangle)_A |\psi_\beta\rangle_B - (|\psi_\beta\rangle)_A |\psi_\alpha\rangle_B\}$$

Where A represents Alice's photon am B represents Bob's photon.

The entangled state is formed using diode pump laser 31 and non-linear material 33 which is configured to perform parametric-down conversion. Parametric down conversion of a single photon produces two photons of equal energy with anti-correlated (opposite) polarisations. The two polarisation entangled photons are emitted from non-linear material in different directions, because the photons have different k vectors. One photon 37 down optic fibre 39 towards Alice and the other single photon 41 down optic fibre 43 towards Bob.

In this case, both Alice and Bob have receivers, The photon 37 which is received by Alice, first passes through polarising beam splitter 45. A polariser could also be used. The polarising beam splitter sends the photon down path 47a to detector 49a if an α state is measured and the photon travels down path 47b to detector 49b if the β state of polarisation is determined by the polarising beam splitter.

Bob's receiver is identical to Alice's, photons received by Bob are first passed through polarising beam splitter 51. The polarising beam splitter sends the photon down path 53a to detector 55a if an α state is measured and the photon travels down path 53b to detector 55b if the β state of polarisation is determined by the polarising beam splitter.

The polarisation measurement which Alice makes will collapse the wave function of Bob's photon state such tat Alice's measurements are anti-correlated with Bob's measurement can code bits onto the photons if they measure in the basis. For example, if Alice makes a measurement in the ψ basis, and measure the α state ψ i.e. $\psi_\alpha$, then the wavefunction of Bob's photon state collapses to $\psi_\beta$. If he measures in the ψ basis he gets the correct answer, if he measures in the φ basis, he will have approximately a 50% of obtaining the correct answer. As previously described, Alice and Bob check that they used the same basis for the measurements and discard incorrect basis results if they are using the BB84 protocol. Using B92, Bob will tell Alice when he measured photons and the key can be established as described with reference to FIG. 3.

By performing her measurement, Alice (assuming she measures first) sets the polarisation of Bob's photon 4. If Bob measures using the wrong basis, i.e. the φ basis, then he will only have a 50% chance of correctly identifying the α or β state in the same manner as described with reference to FIG. 2 for BB84 and FIG. 3 for B92.

The effect of Eve will be exactly the same as described with respect to FIG. 2 where Eve is thought of as intercepting photons sent from Alice to Bob. In the entangled photon situation, Eve has to intercept one of the polarisation entangled photons, either the one sent to Alice or the one sent to Bob. Once she measure one of these photons, she will collapse the wavefunction of the other photon hence setting its polarisation state. In order to cover her tracks, she will have to generate a photon in place of the one she has destroyed by measurement. However, she cannot generate an entangled photon state, instead, she must generate a photon having the same polarisation state as the photon she measured.

Without the presence of Eve, if Alice is encoding the photons by measuring their polarisation, then Alice knows to 100% accuracy what Bob should measure. Bob, using BB84 or B92, will have a 75% chance of correctly obtaining the bit-state of the photon and a 50% chance of choosing the correct polarisation basis for the photon. However, if Eve intercepts the photon, she collapses the wave function, fixes Bob and Alice's states. If she measures in the wrong basis, she introduces an error into their result with a probability of approximately 50%. This larger error allows the presence of Eve to be detected by comparing a part of the key in the same way as described with reference to FIG. 2.

Figure 6:
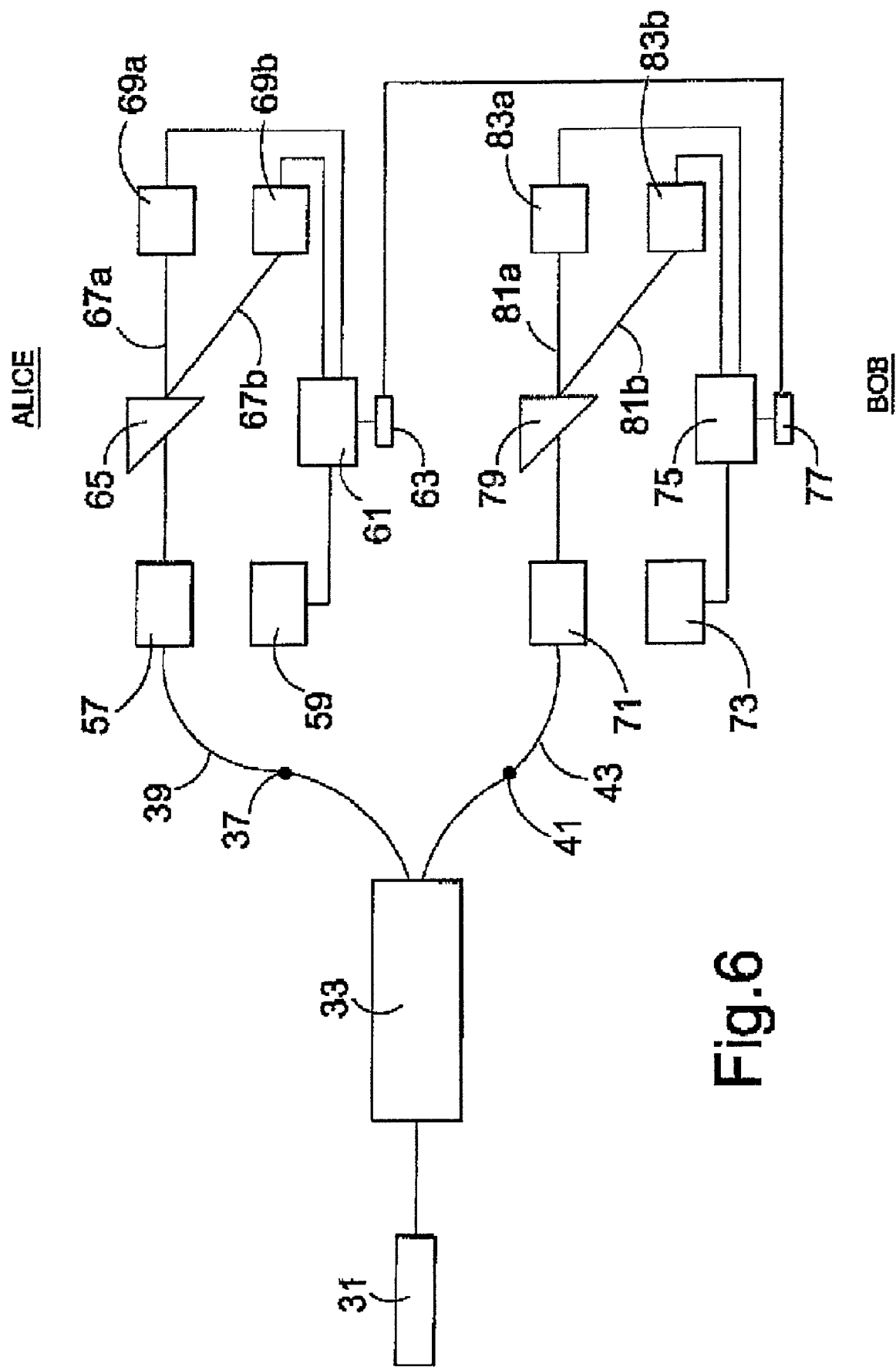
FIG. 6 shows the apparatus of FIG. 5 in more detail.

FIG. 6 shows the apparatus of FIG. 5 in more detail. To avoid unnecessary repetition, the same reference numerals will be used to denote like features. As explained with reference to FIG. 5, two entangled photons 37, 41 having opposite polarizations are generated. One is sent to Alice via fibre optic cable 39 and one is sent to Bob via fibre optic cable 43. It should be noted that photons 37, 41 could be sent through free space to Alice and Bob.

Alice's receiver comprise an electro-optic modulator 57 which is capable of switching the measurement axis of Alice's receiver between 0° and 45°. Thus, this electro-optic modulator sets the basis. The electro-optic modulator is connected to random number generator 59 which randomly switches the basis between 0° and 45°. The random number generator is linked to computer 61 which keeps a record of which basis Alice used. A clock input is provided by clock 63 into computer 61 in order to correlate the photons received at Alice's receiver and Bob's receiver. Both Alice and Bob should receive the photons at the same time. However, there is always a chance that a photon may be lost.

Once the photon is passed through electro-optic modulator 57, it is passed into polarising splitter 65. Polarising beam splitter acts in the same way as the polarising beam splitter described with relation to FIG. 5. If an α polarisation state is measured the photon is fed down fibre optic cable 67a to detector 69*a* and if a β polarisation state is measured, the photon is fed down fibre optic cable 67*b* to detector 69*b*.

The, outputs from both detectors 69*a*, 69*b* are fed into computer 61 in order to save the results. Then each result can be correlated with the basis applied by the electro-optic modulator 57.

Bob's apparatus is identical to Alice's and comprises an electro-optic modulator 57 which is capable of switching the measurement basis of Bob's receiver between 0° and 45° in the manner described with reference to Alice's receiver. The electro-optic modulator is connected to random number generator 73 and which is in turn linked to computer 75 which keeps a record of which basis Bob used. A clock input is provided by clock 77 which is synchronised via cable 78 with Alice's clock 63 in order to correlate the photons received at Alice's receiver and Bob's receiver, Once the photon is passed through electro-optic modulator 71, it is passed into polarsing beam splitter 79. If an α polarisation state is measured, the photon is fed down fibre optic cable 81*a* to detector 83*a* and if a β polarisation state is measured, the photon is fed down fibre optic cable 81*b* to detector 83*b*.

The outputs from both detectors 83*a*, 83*b* are fed into computer 75 in order to save the results. Then each result can be correlated with the basis applied by the electro-optic modulator 71.

Bob and Alice compare their results in exactly the same way as described with reference to FIGS. 2 and 5. However, Alice and Bob have complementary results. If Alice measures 011000, then Bob has 100111. Therefore, one of them has to invert their results in order to obtain the same key.

Figure 7:
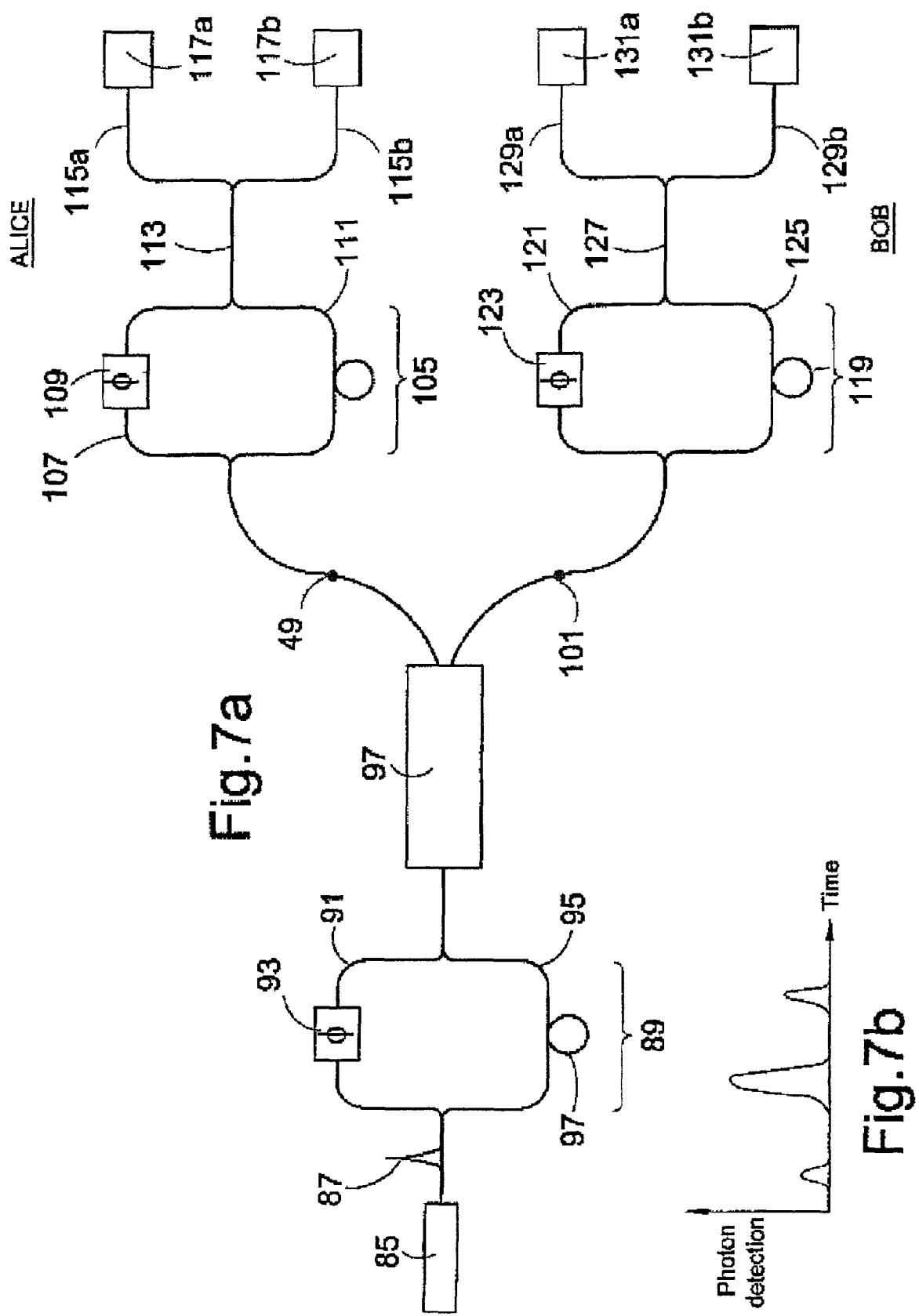
FIG. 7 shows a variation on the apparatus of FIG. 4 using the known method of phase entangled photon pairs to establish a key.

The apparatus of FIG. 7 is configured for phase-entangled or energy-time entangled photons as described in Tittel et al. Phys, Rev. Lett 84 4737 (2000). In the same manner as described with reference to FIGS. 5 and 6, laser 85 emits a single photon pulse 87. The single photon then encounters interferometer arrangement 89. The upper short path 91 of interferometer arrangement 89 passes tough phase modulator 93. Phase modulator 93 randomly selected phase shift.

The lower long path 95 of interferometer 89 passes through delay loop 97. The lower path 91 is longer than the upper path. The photon emerging from the interferometer 89 is then passed into non-linear optical material 97 for parametric down conversion to produce an entangled photon pair 99, 101. One photon 99 is sent to Alice and the other 101 sent to Bob.

Alice and Bob's receivers are identical. Considering Alice's receiver, on entering the receiver, one photon 99 enters Alice's interferometer 105. The upper shot path 107 of the interferometer 105 passes through phase modulator 109 which is connected to a random number generator (not shown). This phase modulator 109 will also randomly apply a phase shift to the upper short path 107.

The lower path 111 is longer than the upper path 107 by the same amount that the longer path 95 is longer than the upper path 91 of the interferometer 89 in the entangled photon source.

The upper 107 and lower 111 paths are then combined at beam coupler 113. The beam coupler is configured such that if the phase of the photon destructively interferes, it will be directed along exit path 115*a* into detector 117*a*, and the phases constructively interfere, then it will be directed along exit path 115*b* into detector 117*b*.

Bob's receiver is identical to that of Alice's. Photon 101 enters interferometer 119 which has an upper path 121 which passes through phase modulator 123 (which can introduce a randomly selected phase shift) or a lower path 125 which is longer than the upper path. The paths are combined at beam coupler 127 which directs the photon along exit path 129*a* into detector 131*a* if the phase of the photon destructively interferes and along exit path 129*b* into detector 131*b* if the phase of the photon constructively interferes.

FIG. 7*b* shows typical results which can be measured by Alice or Bob. For each photon pulse emitter by laser 85, one of three possible signals can be obtained. Taking the signals which Alice obtains as an example, the first signal in time will be a signal from the path which follows the short path (s) 91 of interferometer 89 and the short path (s) 107 of interferometer 105. The second peak in time is dues to signals which have followed the long path (l) 95 through interferometer 89 and the short path (s) 107 through interferometer 105 or the short path (s) 91 through interferometer 89 and the long path (ι) 111 through interferometer 105. The third and final signal in time is due to signals which have passes through the long path (ι) 95 of interferometer 89 and the long path (ι) 111 of interferometer 105.

The first and third peaks are termed 'satellite peaks' whereas the second peak will be referred to as the central peak. Both the satellite peaks and the central peak can be used for the key. Once Alice and Bob have measured all of the photons, they must communicate over a public channel to declare whether they measured a satellite peak or a central peak for each photon.

Considering the central peaks first. If Alice measures a central peak then she knows that Bob has measured a central peak.

Alice performs her phase measurement, by adding a phase shift using phase modulator 109 to the signal which passes through the upper short path 107 of modulator 105. Alice's phase modulator adds a randomly selected phase shift. By making this measurement, she collapses the wavefunction of Bob's photon 101 such that its phase is set.

Bob measures his photon by passing it through interferometer 119. Bob randomly switches his measuring basis by changing the phase added by phase modulator 123 randomly between the allowed phase settings.

If the difference in the phase shift added by Alice' phase modulator 109 and Bob's phase modulator 123 is 0°, then the phase of Alice's photon will constructively interfere and the phase of Bob's photon will constructively interfere. Therefore, Alice's detector 117*b* and Bob's detector 131*b* will both register a count.

If the difference in the phase shift added by Alice' phase modulator 109 and Bob's phase modulator 123 is 180°, then Alice's photon will destructively interfere with itself and Bob's photon will destructively interfere with itself. Therefore, Alice's detector 117*a* and Bob's detector 131*a* will both register a count.

In order to determine the key, Alice needs to contact Bob to tell him which phases she used and then Bob tells Alice which results to keep. Alternatively, Bob could contact Alice first. The key is ten derived in the same manner as described with reference to any of FIGS. 2 to 4.

If the three phases are chosen such that Alice and Bob both have the same detector clicking, then results are kept exactly like BB84. The details of the above method are given in Tittel et al. Phys. Rev. Lett 84 4737 (2000).

The other method is to measure the satellite peaks using 'time basis'. If Alice measures the first peak, she collapses Bob's wavefunction such that he can only measure the first peak. Similarly, if she measures the third peak, she collapses Bob's wavefunction such that he can only measure the third peak. Therefore, Alice knows that her measurements correspond with Bob's, Alice and Bob can switch between using time measurements (i.e. the satellite peaks) and energy (the central peaks).

In the description which accompanies FIGS. 1 to 7, each photon carries just one bit of information i.e. a 0 or 1. This is known as one qubit (quantum bit) of information. When Alice communicates a message to Bob using any of the above techniques, Bob must throw away approximately half of the received message.

Figure 8:
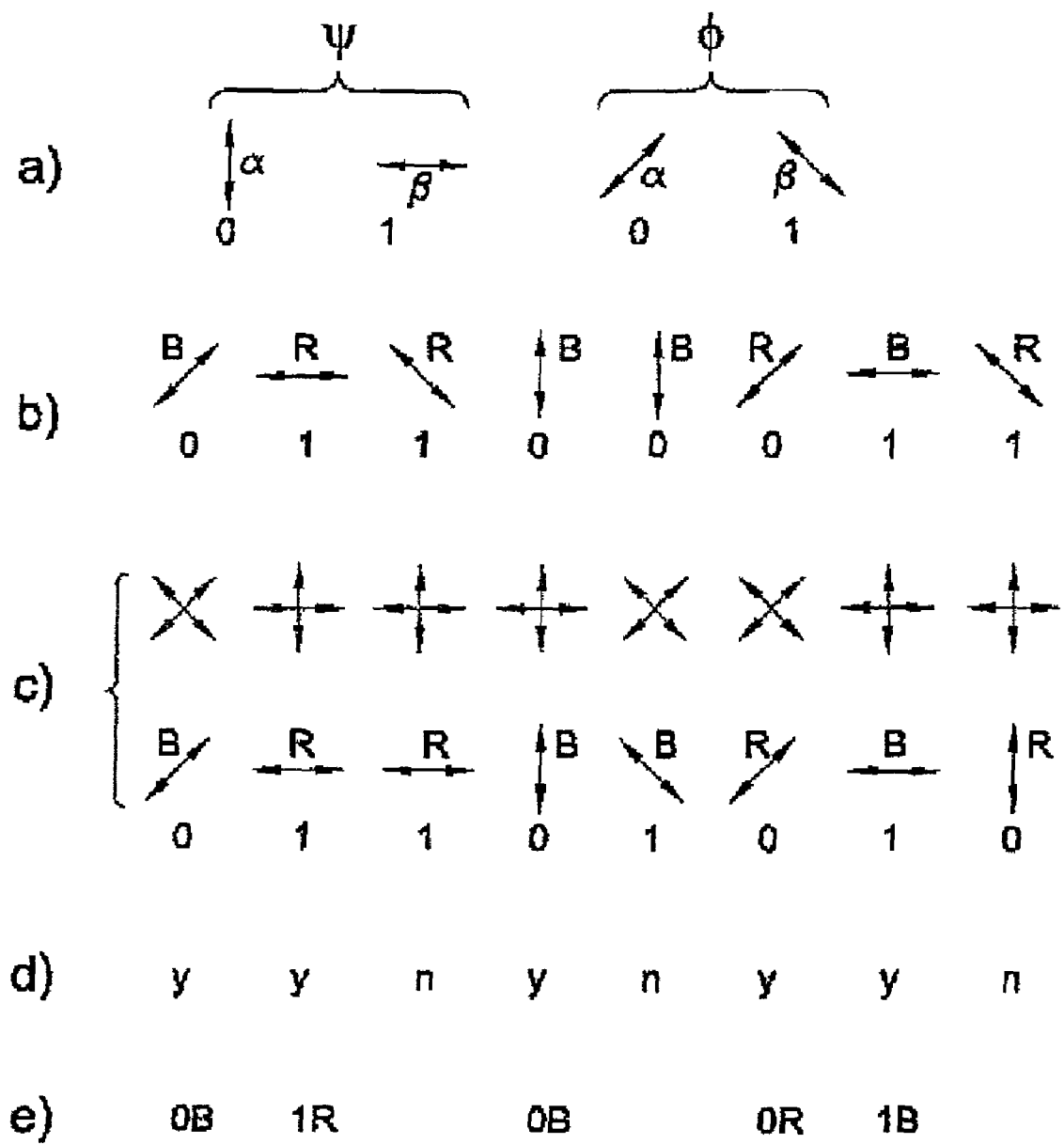
FIG. 8 is a schematic showing a series of steps used to establish a key in accordance with an embodiment of the present invention.

FIG. 8 is a schematic which is used to demonstrate a method in accordance with a further embodiment of the present invention.

In this embodiment, each photon carries an additional bit or bits of classical information in addition to the quantum bit or qubit of information.

Initially, this embodiment will be described with reference to FIG. 8 using a protocol similar to that of BB84. As for BB84, two polarisation basis are agreed by Alice and Bob beforehand. These are shown in FIG. 8a. In addition to these polarisation sates, Alice and Bob also agree to send photons having different colours (wavelengths). In this simplified example, in addition to having a polarisation state as shown in FIG. 8, each photon will either be sent as a blue photon or a red photon. In the same manner as described with reference to FIG. 2, Alice sends photons to Bob using the quantum channel. In addition to randomly varying the basis, the colour of the photons will also be randomly varied, an "F" indicates a red photon and a "B" indicates a blue photon.

As described in relation to FIG. 2, Bob then randomly chooses different polarisaton basis to measure the received photons and measures the colour as well. Alice and Bob then communicate over the classical channel in order to work out which results need to be discarded and the key is established. They compare measurement basis for qubit only as the colour is classical information. However, here, each photon retained contains two bits of information, the qubit derived from the polarisation and the classical bit derived by measuring whether or not the photon is red or blue.

Eve has the same effect on the measurements as she does for standard BB84. Eve cannot simply measure the quantum or the classical information as performing the measurement will destroy the single photon. Therefore, to obtain maximum information Eve must measure both the colour and the quantum sate of the photon at the same time. The measurement of colour is classical and hence, Eve can determine the colour with a theoretical accuracy of 100%,.

Thus, Eve introduces errors onto the quantum part of the key at the same rate as for BB84 and only this part of the key is therefore used for testing for eavesdropping. However, this example allows the data rate between Alice and Bob to be increased, along with the final key length.

There is no need to use just two colours. Any number of distinct colours can be used providing that Bob has equipment which can resolve the different colours.

For example, m bits of classical information can be encoded. For this, $2^m$ distinguishable colours are required.

Figure 9:
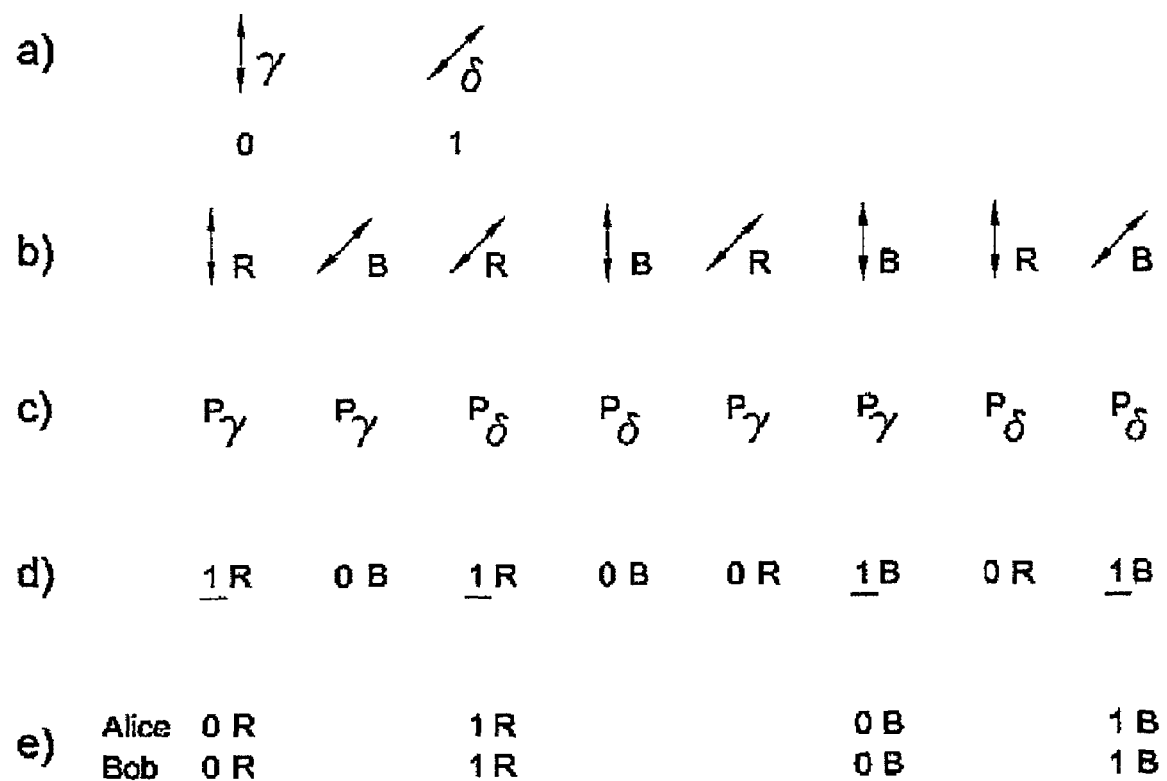
FIG. 9 is a schematic showing a variation on the communication method described with reference to FIG. 8.

FIG. 9 shows the example of FIG. 8 using B92 coding.

As described with reference to FIG. 3, Alice can choose to send the information using a photon having one of states γ or δ. She then sends a stream of photons where each photon randomly has the polarisation state γ or δ and also randomly has colour information, in this example it is either red or blue, encoded onto the photon.

Bob then uses operators $P_\gamma$ and $P_\delta$ described with reference to FIG. 3 and measures (step (c)) the colour in order to obtain the results as shown in step (d).

Bob then tells Alice which results were positive and they discard all zero results as shown in step (e).

As Bob has also measured the colour of each photon, then each photon carries two bits, one qubit and one classical bit of information.

As explained with reference to the example of FIG. 8, it is possible to encode m+1 bits of information on each photon where there is one qubit and m classical bits of information. In order to encode m classical bits, $2^m$ possible distinguishable colours are required.

The effect of Eve on the communication is the same as that described with reference to FIG. 8.

Figure 10:
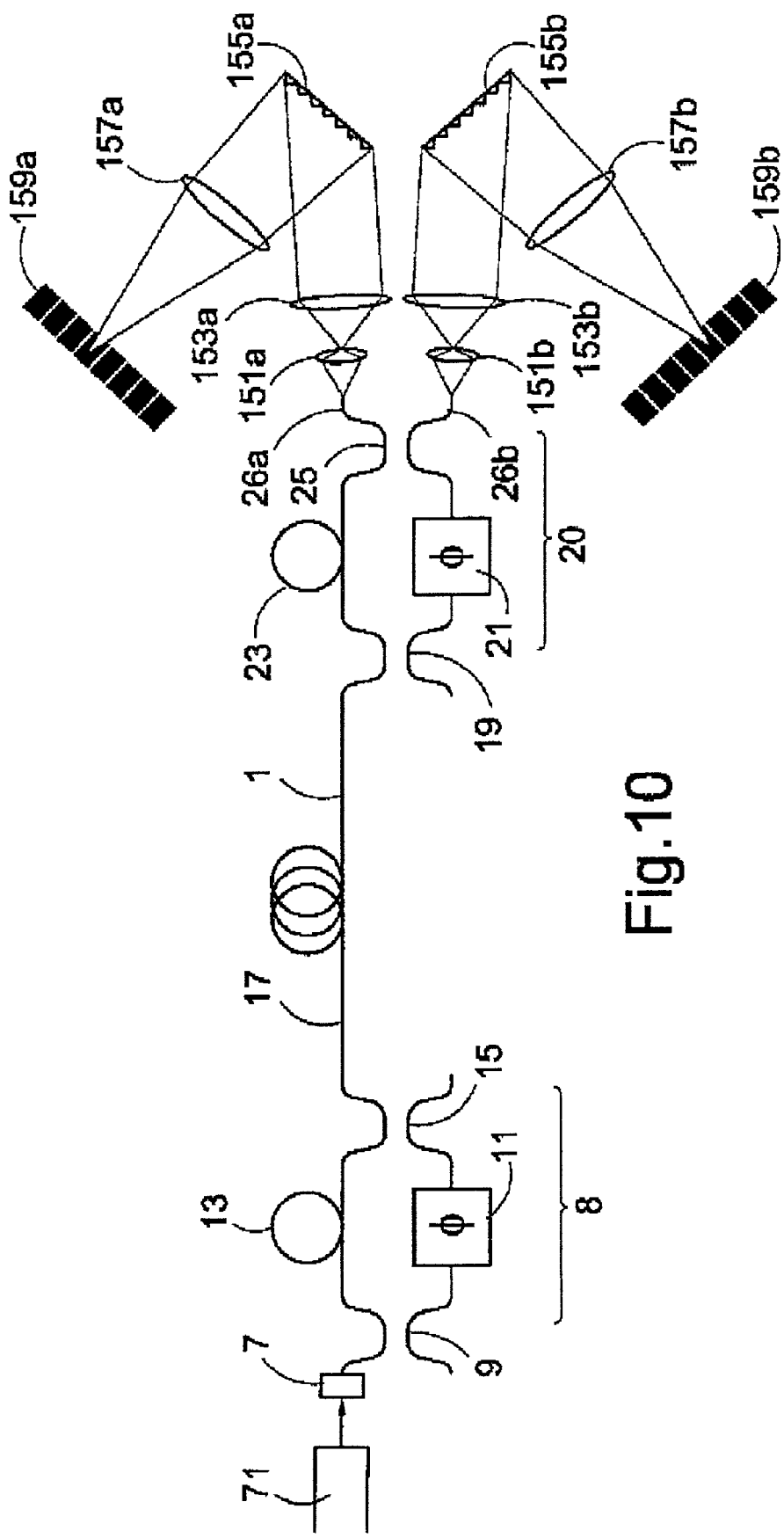
FIG. 10 shows an apparatus which can be used to encode and decode phase and colour information used in accordance with method described with reference to FIGS. 6 or 7.

FIG. 10 shows an apparatus which can be used for the communication method and encoding methods described with reference to FIGS. 8 and 9. The apparatus is largely based on the prior art apparatus of FIG. 4. Therefore, to avoid unnecessary repetition, like reference numerals have been used to denote like features. FIG. 4 uses the signal from a pulsed laser diode. In FIG. 10 photons having different colours are generated by source 71. Source 71 is a wavelength tuneable laser diode which is capable of emitting photons having at least two different colours. The source also comprising means for switching the output from the source to select a particular colour of photon. Alternatively, the source could comprise a plurality of fixed wavelength laser diodes or the like each being configured to emit light of a different wavelength wherein the source being able to switch be n the outputs of the laser diodes in order to select the desired photon colour.

In the same manner as the apparatus described with reference to FIG. 4, the output from laser 71 is attenuated using attenuator 7 to have less than on a photon per pulse and then passes through Alice's interferometer 8. The signal is then transmitted along cable 17 to Bob's receiver.

Inside the receiver, there is an interferometer 20 which is identical to that described with reference to FIG. 4. In the same manner as described with reference to FIG. 4, if the phase of the photon constructively interferes it exits the interferometer through path 26a and if it destructively interferes it exits the interferometer through path 26b.

A photon exiting trough pat 26a is focused using lenses 151a, 153a onto diffraction grating 155a. Diffraction grating 155a will diffract photons of varying wavelengths through different angles. The output of diffraction grating 155a is then focused using lens 157a onto single photon army detector 159a.

Photon array detector 159a comprises an array of single photon detectors. Which photon detector in the array detects a single photon will depend on the position of the single photon beam focused by lens 157a. The position of single photon beam focused by lens 157a is dependent on the wavelength or colour of the photons due to the action of diffraction grating 155a.

When a photon exits the interferometer trough path 26b it is focused using lenses 151b, 153b onto diffraction grating 155b. Diffraction grating 155b will diffract photons of varying wavelengths through different angles. The output of diffraction grating 155b is then focused using lens 157b onto single photon array detector 159b. It is also possible to use "multi-dimensional" photon detectors i.e. single detectors which measure arrival of signal and its colour.

Figure 11:
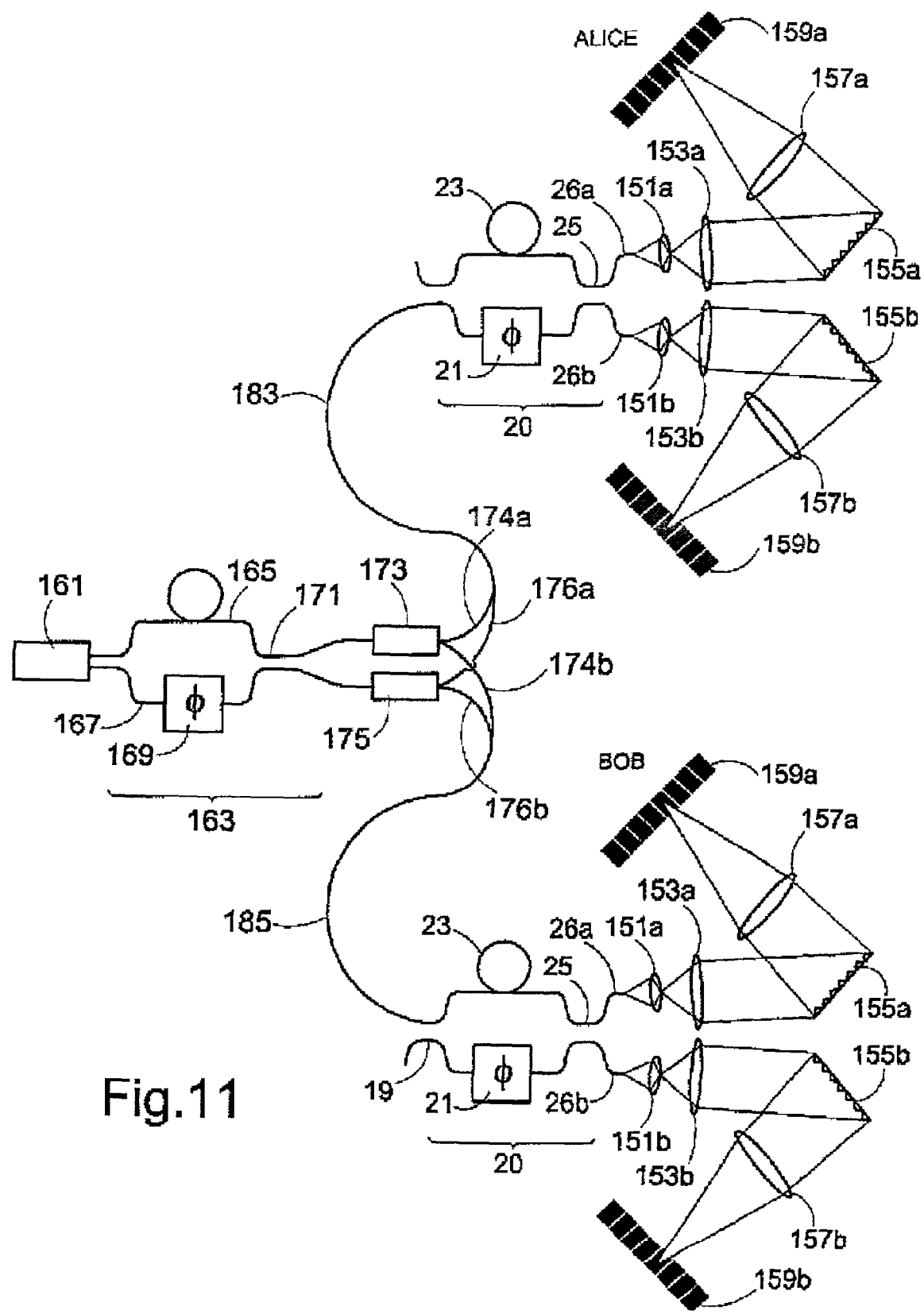
FIG. 11 shows a variation on the apparatus of FIG. 10 using a phase entangled photon source, to establish a key using both phase and colour.
Figure 12:
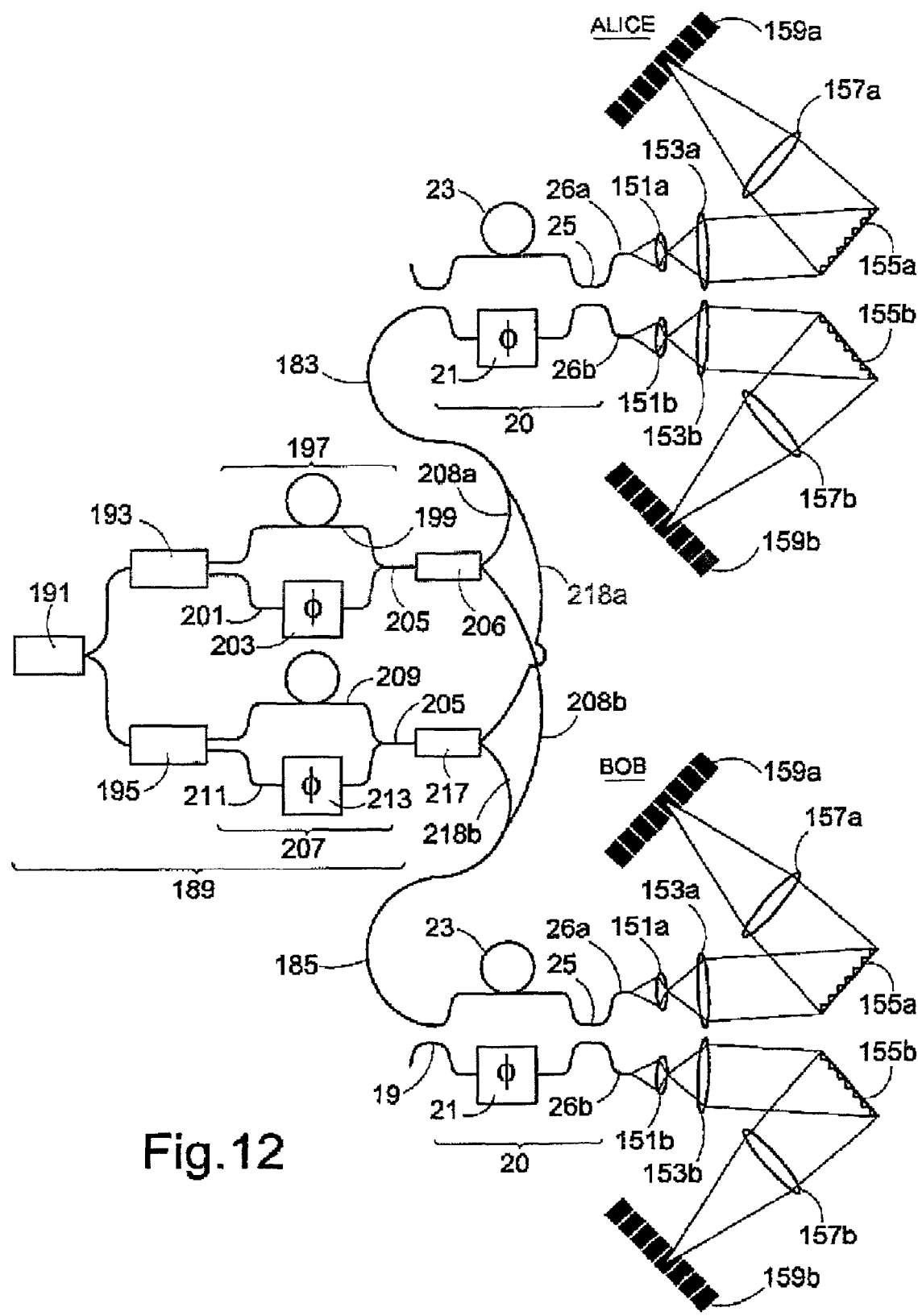
FIG. 12 shows as variation on the apparatus of FIG. 11.

FIGS. 11 and 12 show fierier variations on the apparatus which can be used to encode photons with both a quantum bit and at least one classical bit.

In FIG. 11 uses phase entangled photons to establish the key. Alice and Bob both have receivers which are identical to the receiver described with reference to FIG. 10. In FIG. 11 like reference numerals are used to denote like features. The entangled photon source comprises a source 161 which is capable of emitting single photons having one of at two randomly selected wavelengths. Of course, the source could be configured to generate three or more different wavelengths. The output from source 161 is then fed onto interferometer 163 which is identical to interferometer 89 of FIG. 7.

The upper long path 165 of interferometer 163 passes through a delay loop. The lower short path 167 of interferometer arrangement 163 passes tough phase modulator 169. Phase modulator 93 randomly switched between adding a phase shift of 0°, 90°, 180°, or 270°. The upper path 165 is longer an the lower path 167. The pats are combined at beam combiner 171.

The beam splitter/combiner 171 send the photon down a path either towards first non-linear material 173 or towards second non-linear martial 175. The beam coupler is capable of directing photons having a first wavelength into first non-linear optical material 173 and photons having a second wavelength into second non-linear optical material 175. Two non-linear optical materials will probably be required as some non-linear optics materials can only perform parametric down conversion in response to irradiation by selected input frequencies. Hence, it may not be possible to have a single non-linear optical material which could parametrically down convert the photons of both wavelengths emitted by source 161.

The source can generate a phase entangled photon pair using either of the two non-linear materials 173, 175 and hence can generate a phase entangled photon pair having one from a choice of two different colours.

The photons of a photon pair outputted from the fist non-linear material 173 directed in different directions and one is collected by fibre optic cable 174a and the other by fibre optic cable 174b. Mirrors or other free space optics could also be used to direct the outputted photons to Alice and Bob. The photons of a photon pair emitted from second non-linear material 175 are also directed in different directions by virtue of their different k values. One of the photons will be collected by fibre optic cable 176a and the other by fibre optic cable 176b. Fibre optic cables 174a and 176b are coupled to form fibre optic cable 183 which directs photons to Alice. Fibre optic cables 174b and 176b are coupled to form fibre optic cable 185 which directs photons to Bob.

Alice and Bob can determine the quantum bit of each photon using interferometers 20. The method of establishing the key using phase entangled photon pairs has been described in detail with reference to FIG. 7. In the same way as described with reference to FIG. 7, a photon will exit interferometer through either path 26a (if it destructively interferes with itself) or 26b if it constructively interferes with itself Instead of passing strait into a detector, the photon is reflected off diffraction grating 155a, b in the same manner as described with reference to FIG. 10 so t its colour can be determined.

In the above apparatus, Alice and Bob cannot control the colour of the photons. However, Alice knows that Bob's photon will be the sane colour as hers if the non-linear materials 173 and 175 are each configured to emit photon pairs having fie same wavelength. However, parametric down conversion can result in the generator of entangled photon pairs having differing wavelengths. However, in his situation, Alice and Bob on measuring the wavelength of their photon would know the wavelength of the other photon.

FIG. 12 shows a further variation on the apparatus of FIG. 11. Alice's and Bob's receivers remain identical to those described with reference to FIG. 11 and a description of them Or their function will not be repeated.

Source 189 is configured to emit phase entangled photon pairs having one of two different colours. The source comprises a random number generator 191 which randomly chooses between activating a first laser source 193 or a second laser source 195. The first and second laser sources are configured to generate photons having different colours.

Assuming that the random number generator 191 activates the first source 193, the output of the sources is then fed into interferometer 197 which is identical to interferometer 89 of FIG. 7.

The upper long path 199 of interferometer 197 passes through a delay loop. The lower short path 201 of interferometer arrangement 189 passes through phase modulator 203.

Phase modulator 203 randomly switched between adding a phase shift of 0°, 90°, 180°, or 270°, The upper path 199 is longer than the lower path 201. Due to the wave-like nature of the photon, it essentially passes through both paths a 99, 201 at the same time. The pats are combined at beam coupler 205.

The output from coupler 205 is then fed into first non-linear material 206. Non-linear material 206 will produce a phase entangled photon pair.

If the second laser 195 is activated, a single photon enters interferometer 207. The upper long path 209 of interferometer 207 passes through a delay loop. The lower short path 211 of interferometer arrangement 207 passes through phase modulator 213. Phase modulator 213 randomly switched between adding a phase shift of 0°, 90°, 180°or 270°. The upper path 209 is longer than the lower path 211. The paths are combined at beam coupler 215.

The output from coupler 215 is then fed into second non-linear material 217. Non-linear material 217 will produce a phase entangled photon pair.

First non-linear material 206 emits the photons of a photon pair in different directions. One of these photons is collected by optical fibre 208a and the other by optical fibre 208b. The photons of a photon pair emitted by non-linear material 217 are also emitted in different directions and one is collected by optical fibre 218a and the other by optical fibre 218b. Optical fibres 208a and 218a are coupled to form optical fibre 183 which directs photons to Alice. Optical fibres 208b and 218b are coupled into optical fibre 185 which directs photons to Bob. It should be noted that only one non-linear material 206, 217 will emit photons at any one time.

The quantum bit and classical bits are then decoded in the same manner as described with reference to FIG. 11.

Figure 13:
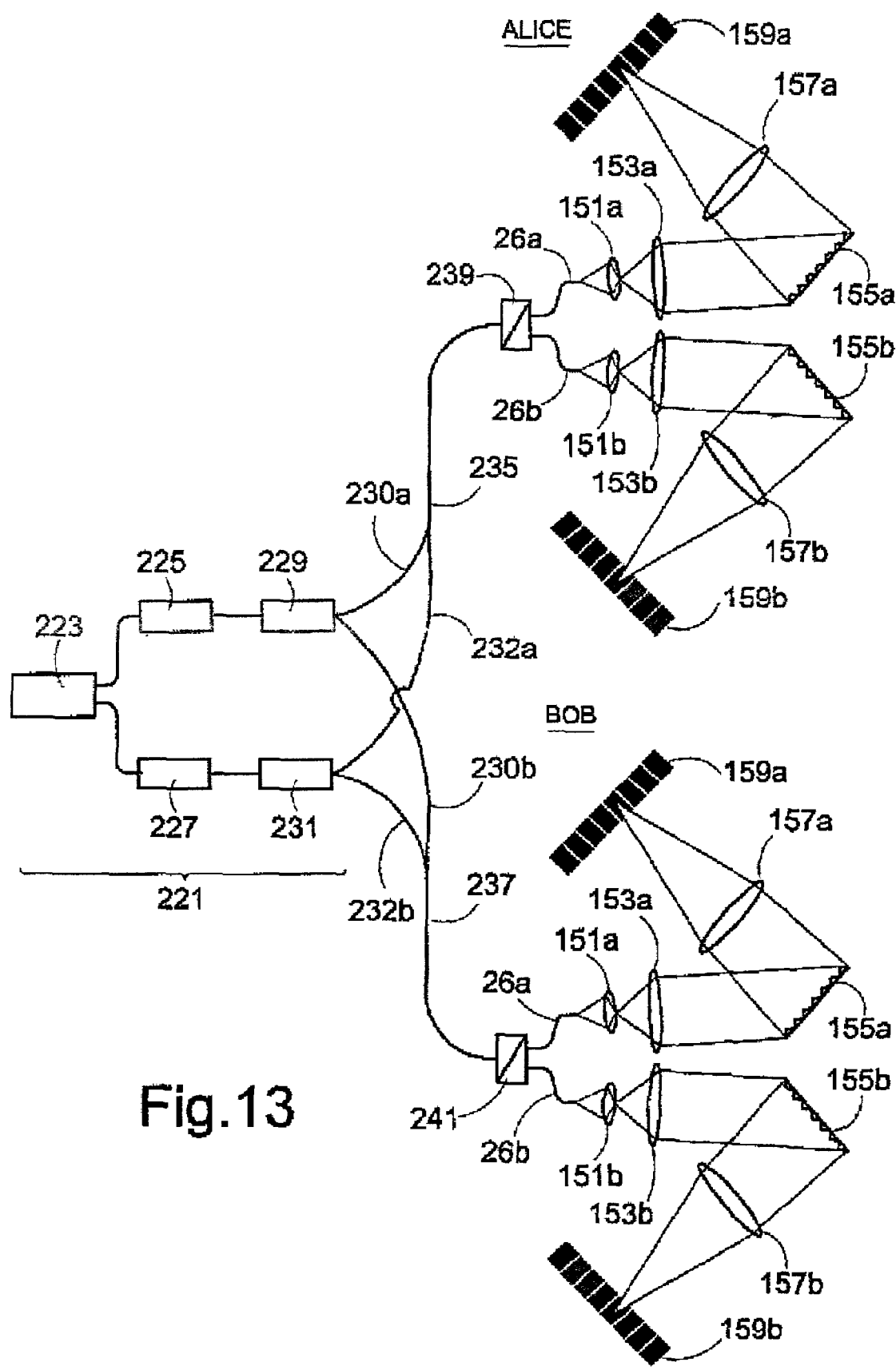
FIG. 13 shows a variation on the apparatus of FIG. 10 using an entangled photon source, to establish a key using both polarisation and colour.
Figure 14:
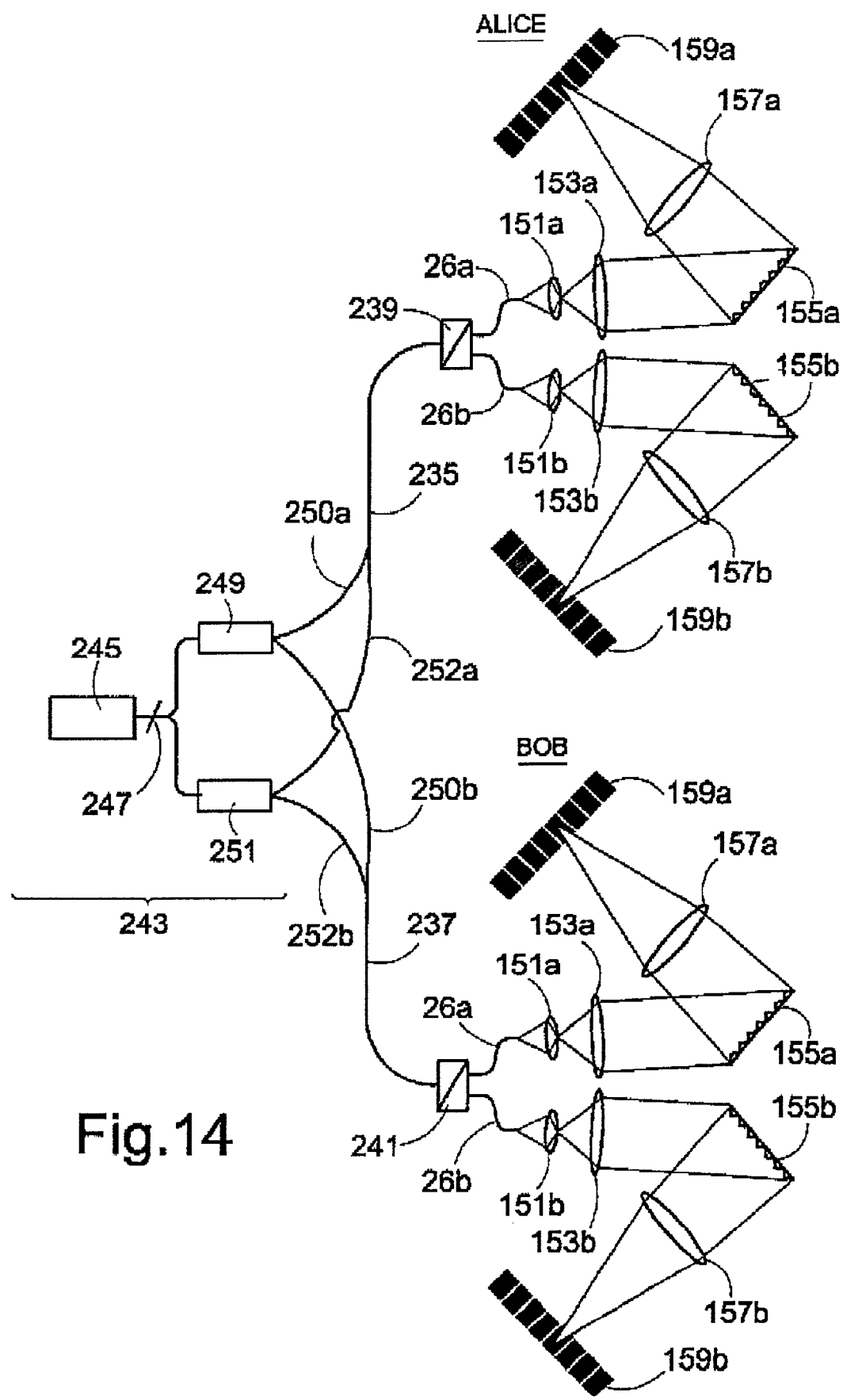
FIG. 14 shows a variation on the apparatus of FIG. 13.

FIGS. 13 and 14 show apparatus which uses a polarisation entangled photon source to encode photons using polarisation as a quantum parameter and colour as a classical parameter.

The entangled photon pair is generated using source 221. The source comprises a random number generator 223 which randomly selects one of a first laser 225 or a second laser 227. The first laser 225 is configured to emit single photons having a different wavelength to those of the second laser 227.

The first laser 225 is configured to emit single photons into non-linear material 229. Non-linear material 229 performs parametric down-conversion on the photon emitted by laser 225 to generate a polarisation entangled photon pair.

The second laser 227, when activated, emits single photons into second nonlinear material 231 which parametrically down converts a photon into a polarisation entangled photon pair.

One photon from the photon pair emitted by first non-linear material 229 is collected by fibre optic cable 230a, while the other photon is collected by fibre optic cable 230b. One of the photons of the photon pair emitted by second non-linear material 231 is collected by fibre optic cable 232a, the other photon of the photon pair is collected by fibre optic cable 232b. Fibre optic cables 230a and 232a are coupled into fibre 235 which directs photons to Alice. Fibre optic cables 230b and 232b are coupled into fibre optic cable 237 which directs photons to Bob's receiver.

It should be noted that only one of the first and second non-linear materials will generate a photon pair at any one time. Also, the first and second non-linear materials will output photons having different colours as lasers 225, 227 emit photons of different colours. One photon is directed to Alice's receiver along fibre optic cable 235 and the other to Bob's receiver along fibre optic cable 237.

Alice measures the polarisation of her photon using polarising beam splitter 239. Alice randomly switches between measuring using one of two different basis as described in detail with reference to FIGS. 5 and 6. Alice's measurement collapses Bob's photon's wavefunction.

Alice's photon then exits the polarising beam splitter 239 either through path 26a or 26b, The colour of the photon is then determined using diffraction gratings 155a, 155b as described with reference to FIG. 10.

The photon enter Bob's receiver via cable 237 and is passed trough polarising beam splitter 241. Bob can chose to measure the polarisation of his photon using two different basis as explained in detail with reference to FIGS. 5 and 6. The photon exits the polarising beam splitter either through path 26a or 26b. The colour of the photon is determined using a diffraction grating as described with reference to FIG. 10.

FIG. 14 shows a variation on the apparatus of FIG. 13. Alice's and Bob's receivers are identical to those described with relation to FIG. 13 and a description of their structure of function will not be repeated here. Like reference numerals are used to denote like features.

The difference between the apparatus of FIGS. 13 and 14 lies in the source of the polarisation entangled pairs. The source 221 of FIG. 13 uses two lasers where one laser outputs photons having one colour and the other laser outputs photons having a different colour. In FIG. 14, source 243 can use a single laser source which can output photons having different wavelengths. The sources of FIGS. 13 and 14 both use two types of non-linear materials in order to accommodate the two different-coloured photons which are emitted by the laser or lasers.

Source 243 comprises a laser diode 245 which is configured to generate single photons having one of two wavelengths. The laser randomly switches between the two wavelengths. A photon emitted from diode 245 then enters beam splitter 247. Beam splitter 247 is configured to direct photons having a first wavelength into a first non-linear material 249 and photons having a second wavelength into second non-linear material 251.

The first non-linear material 249 will generate a polarisation entangled photon pair having a different colour to that of the polarisation entangled photon pair generated by the second non-linear material 251, the incident photon for both materials having the different wavelengths.

One of the photons of the photon pair generated by the first non-linear material 249 is collected by optical fibre 250a, the other photon is collected by optical fibre 250b. One of the photons emitted from second non-linear material 251 is collected by fibre 252a, the other photon is collected by fibre 252b. Fibres 250a and 252a are coupled into fibre 235 which directs photons to Alice's receiver and fibres 250b and 252b are coupled into fibre 23 which directs photons into Bob's receiver.

In accordance with a further embodiment of the present invention, a method of encoding information and a communication method is provided which will be explained with reference to FIG. 15.

In this example, two quantum bits (qubits) of information are encoded on each photon. Initially, this will be described with reference to the BB84 system. However, it will later be described with reference to the B92 system and a hybrid of both systems.

In this example, Alice and Bob decide to use two different polarisation bases $\psi$ and $\phi$. The basis have an angle of 45° between themselves. Each basis has two orthogonal states $\alpha$ and $\beta$. They also decide on two phase bases, $\theta$ and $_{102}$. State $\theta$ has two orthogonal states $\alpha$ and $\beta$ and basis $\chi$ has two orthogonal states $\alpha$ and $\beta$. Polarisation and phase commute, therefore a measurement of one does not disrupt the other and both properties can be measured. The bases obey the following relationships:

$$\langle\psi_i|\psi_j\rangle = \langle\phi_i|\phi_j\rangle = \delta_{i,j} = \langle\theta_i|\theta_j\rangle = \langle\chi_i|\chi_j\rangle$$

$$|\langle\psi_i | \phi_j\rangle|^2 = \frac{1}{2} = |\langle\theta_i | \chi_j\rangle|^2$$

$$|\langle\psi_i | \theta_j\rangle|^2 = \frac{1}{2} = |\langle\theta_i | \chi_j\rangle|^2$$

$$|\langle\psi_i|\theta_j\rangle|^2 = |\langle\psi_i|\chi_j\rangle|^2 = 0 = |\langle\phi_i|\theta_j\rangle|^2 = |\langle\phi_i|\chi_j\rangle|^2$$

Figure 15:
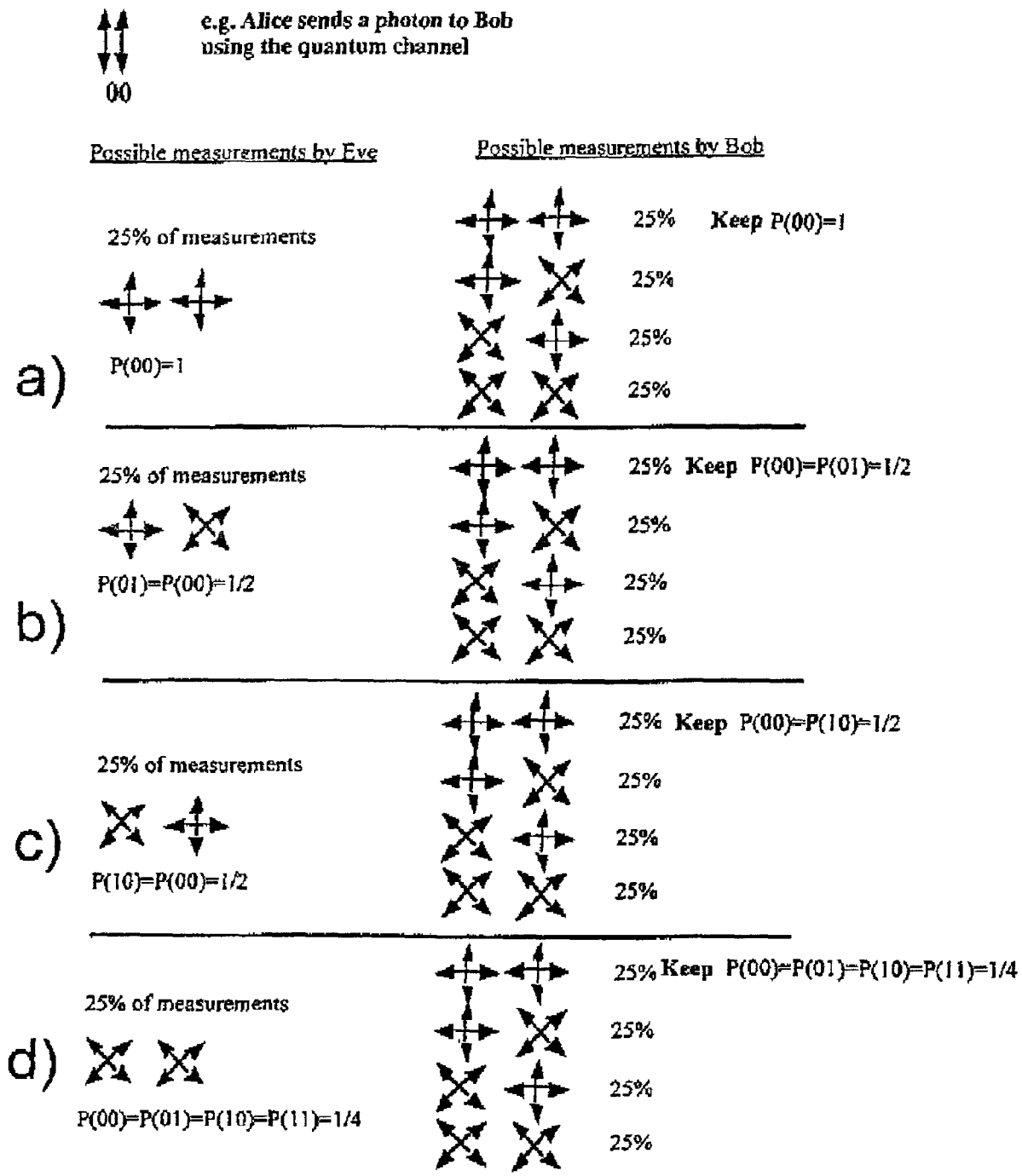
FIG. 15 schematically demonstrates possible measurements which can be made by Eve and Bob when using a method in accordance with a further embodiment of the present invention.

In the example shown in FIG. 15, Alice sends a photon to Bob which is encoded to carry two qubits, one via polarisation $\psi_\alpha$ (chosen from $\psi_\alpha$, $\psi_\beta$, $\phi_\alpha$ and $\phi_\beta$) and one via phase $\theta_\alpha$ (chosen from $\theta_\alpha$ $\theta_\beta$, $\chi_\alpha$ and $\chi_\beta$). Bob needs to get both bases right, but there are four possible combinations of basis which Bob can randomly select. Thus, only a quarter of Bob's results will be measured using the right basis.

FIG. 15 illustrates the situation where Eve has intercepted the signal. Like Bob, Eve has a 25% chance of choosing the correct basis. In the situation shown in FIG. 15a, Eve has chosen the same basis for both polarisation and phase as that of Alice. Therefore, she has correctly identified both qubits and transmits is the photon on to Bob. Bob has a 25% chance of making the correct measurement If he does, he can determine the result with a theoretical accuracy of 100%.

In the case shown in FIG. 15b, Eve chooses the correct basis to measure the polarisation. However, she use an incorrect basis to measure the phase. Therefore, there is only a 50% chance that Eve will transmit the phase information correctly. If Bob uses the correct basis to measure the photon qubits, there is a 50% chance that his result will be wrong. By correct basis, we mean the basis which agrees with that used by Alice.

In step c, it is shown that Eve uses an incorrect basis for measuring the polarisation but a correct basis for measuring the phase. Again, as in the situation of FIG. 15b, Eve only stands a 50% chance of correctly transmitting both the polarisation and phase of the measured photon. Thus, even if Bob uses the correct basis, he only has a 50% chance of identifying both qubits correctly.

In case 15d, Eve uses the wrong basis to measure both the polarisation and the phase. Therefore, Eve only stands a 25% chance of correctly transmitting a photon with the correct polarisation and phase. Thus, even if Bob uses the correct basis, he will only stand a 25% chance of correctly identifying both qubits.

The probability that Bob gets both bits correct i.e. that the bi-bit is correct is ¼×(1+½+½+¼)=9/16. The probability that there is an error in the bi-bit is 7/16.

Only ″/4 results can be used to create the key and 43.75% of these results will be incorrect if an eavesdropper intercepts every photon. Thus, the presence of an eavesdropper should be very easily detected on comparing only a small part of the key.

Further, Eve can only now know only 25% of the key exactly. Thus, this system easily shows the presence of an eavesdropper and also minimises the amount of information which eavesdropper can obtain.

The above example has been described as a variation of the protocol of BB84. However, it would also be possible to use the underlying principles of the B92 protocol to achieve the sane result. Also, a mixture where one parameter is encoded using B84 and the other using B92 could also be used.

The B92 protocol has been described previously with reference to FIG. 3. To avoid unnecessary repetition, details will not be repeated here.

It is also possible to extend the above idea to encoding three bits of information per photon. A photon has three degrees of freedom polarisation, phase and energy.

Figure 16:
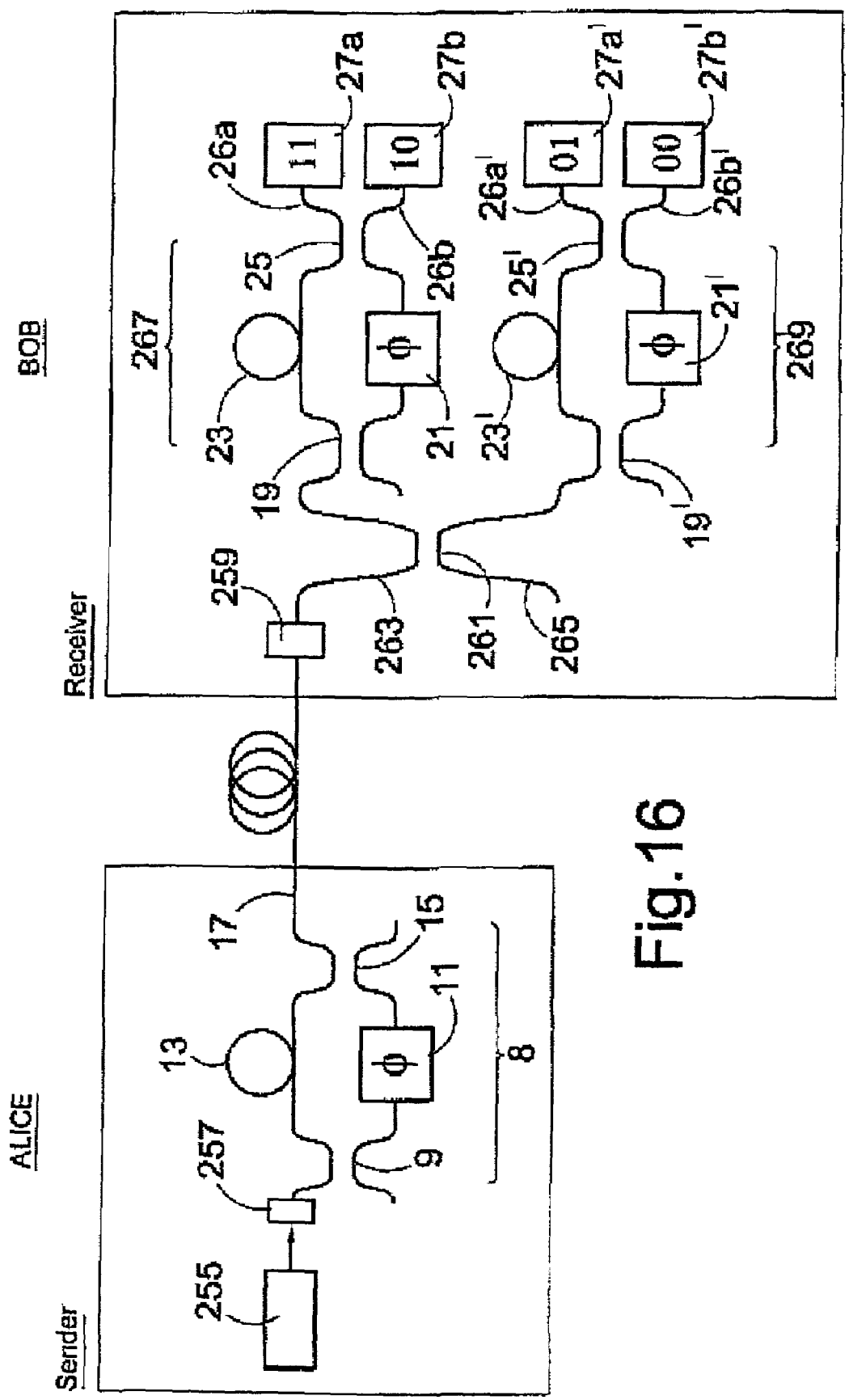
FIG. 16 shows an apparatus which can be used to establish a key in accordance with the embodiment described with reference to FIG. 15.

FIG. 16 shows an example of an apparatus which can be used to perform the method of encoding and communication described with reference to FIG. 15.

Alice's transmitter is very similar to that described with reference to FIG. 4. Therefore, to avoid unnecessary repetition, like reference numerals will be used to denote like features, Alice's transmitter has a single photon source 255 which may be a pulsed laser diode 5 with attenuator 7 as shown in FIG. 4 or a dedicated single photon source which outputs photons. The output photons are fed into polarisation rotator 257.

The polarisation rotator 257 sets the polarisation from one of four possible states which form two basis for BB84 or one of two basis, where only one state can be selected from each basis for B92. The photon with the desired polarisaton is then enters interferometer 8 which is identical both in structure and function to interferometer 8 of FIG. 4. To avoid unnecessary repetition like reference numerals have been used to denote like features.

The photon is then sent down fibre optic cable 17 to Bob's receiver. On entering the receiver, the polarisation of the photon is rotated using polarisation rotator 259. Polarisation rotator 259 is used to set the polarisation measuring basis and will be randomly changed by Bob. In this particular example, the two basis are 45° apart and the polarisation rotator switches randomly between not rotating the polarisation and rotating the polarisation by 45°. The photon is then passed into polarising beam splitter 261 which is able of determining if a photon has one of two orthogonal polarisation states. If the photon has one of the polarisation state e.g. the photo is horizontally polarised, then the photon will exit the polarising beam splitter 261 by path 263 and if it has the orthogonal polarisation state then it will exit the polarising beam splitter along path 265. If the photon has a polarisation state which is 45°between the two states that the polarising beam splitter can measure then the photon has an equal probability of exiting the polarising beam splitter via path 263 or 265.

A photon which exits beam splitter 261 along path 263 is then fed into interferometer 267 which is identical to interferometer 20 of FIG. 4. To avoid unnecessary repetition, like reference numerals have been used to denote like features. If the phase of the photon destructively interferes with itself then it is directed into detector 27a via path 26a and if the phase of the photon constructively interferes then it is directed into detector 27b via path 26b.

If the photon exits the polarising beam splitter via path 265, it then enters interferometer 269 which is identical to interferometer 20 of FIG. 4. To avoid unnecessary repetition like reference numerals are used to denote like features However, the reference numerals are denoted with a "'" in order to distinguish them from interferometer 267.

Interferometer 269 interferes the photon with itself in order to determine its phase. If the photon destructively interferes with itself, then it is directed into detector 27a' via path 26a' and if the photon constructively interferes with itself then it is directed into detector 27b' via path 26b'.

Thus, the polarisation and phase can be determined using the above receiver which has four detectors, 27a, 27b, 27a', 27b'.

Figure 17:
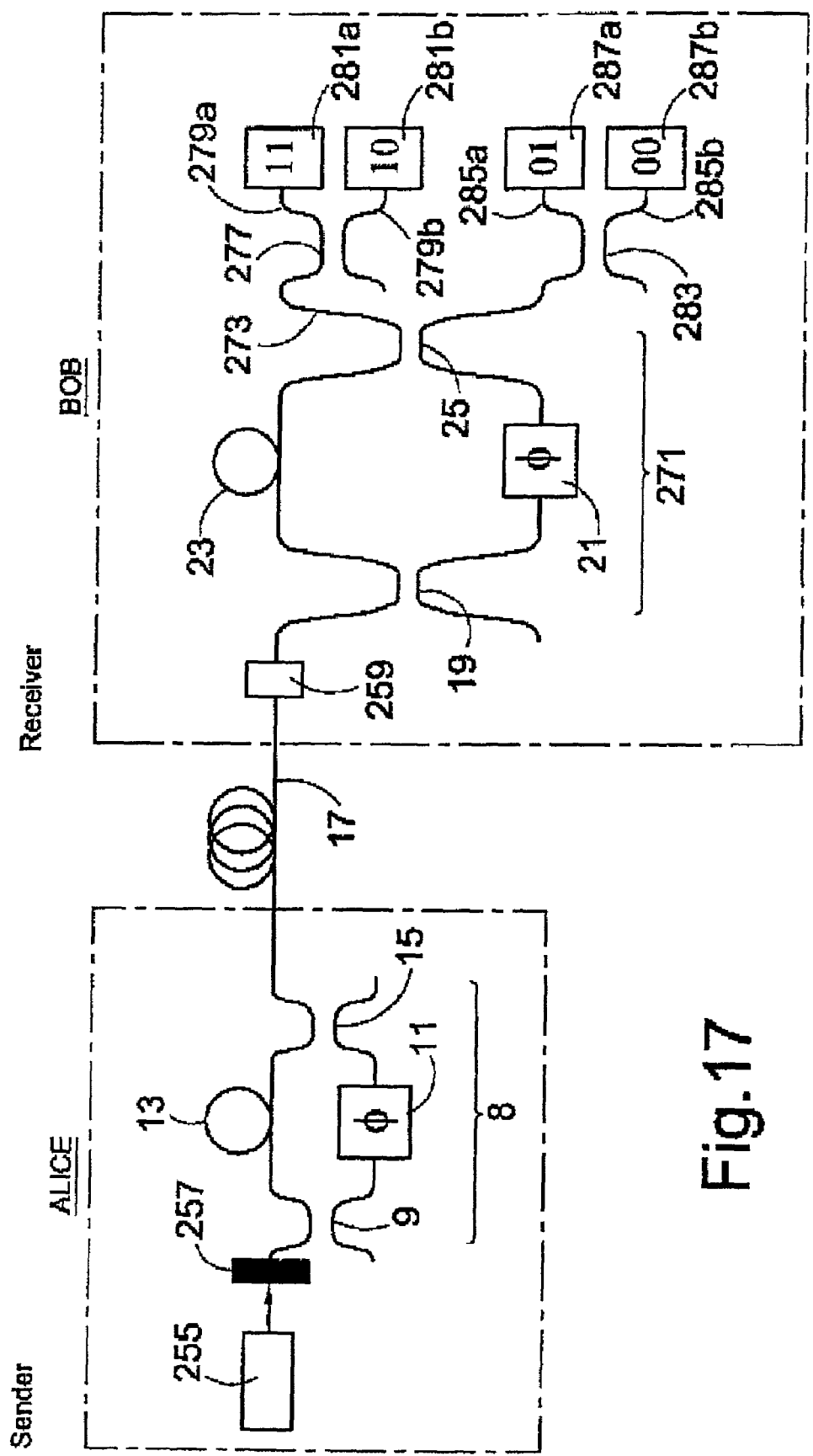
FIG. 17 shows a variation on the apparatus of FIG. 16.

FIG. 17 shows a variation on the apparatus of FIG. 16. The transmitter of Alice is identical to that described with reference to FIG. 16. Therefore, to avoid unnecessary repetition, like reference numerals will be used to denote like features ad no part of the description will be repeated.

In the receiver of FIG. 16, the photon was analysed to determine its polarisation, then its phase. In e receiver of FIG. 17, the phase of the photon is first analysed and then its polarisation.

On entering the receiver, the photon is passed through polarisation rotator 259 which is the same as that described with reference to FIG. 16 and set the measuring basis for the polarisation. The photon is then passed into interferometer 271 which is identical to interferometer 20 of FIG. 4. To avoid unnecessary repetition, like reference numerals will be used to denote like features. If the phase of the photon destructively interferes then it exits the interferometer 271 through path 273. If it constructively interferes, then it exits the interferometer 271 through path 275.

A photon which exits Me interferometer 271 through path 273 enters polarising beam splitter 277 which direct the photon down path 279a to detector 281a if the photon has a first polarisation state and direct the photon down path 279b towards detector 281b if the photon has a second polarisation state which is orthogonal to the first polarisation state.

Similarly, a photon which exits the interferometer 271 by path 275 enters polarising beam splitter 283 which direct the photon down path 285a to detector 287a if the photon has a first polarisation state and direct the photon down path 285b towards detector 289b if the photon has a second polarisation state which is orthogonal to the first polarisation state.

Thus, both the phase and the polarisation of the photon can be determined using the above receiver which has four detectors, 281a, 231b, 287a, 287b.

Figure 18:
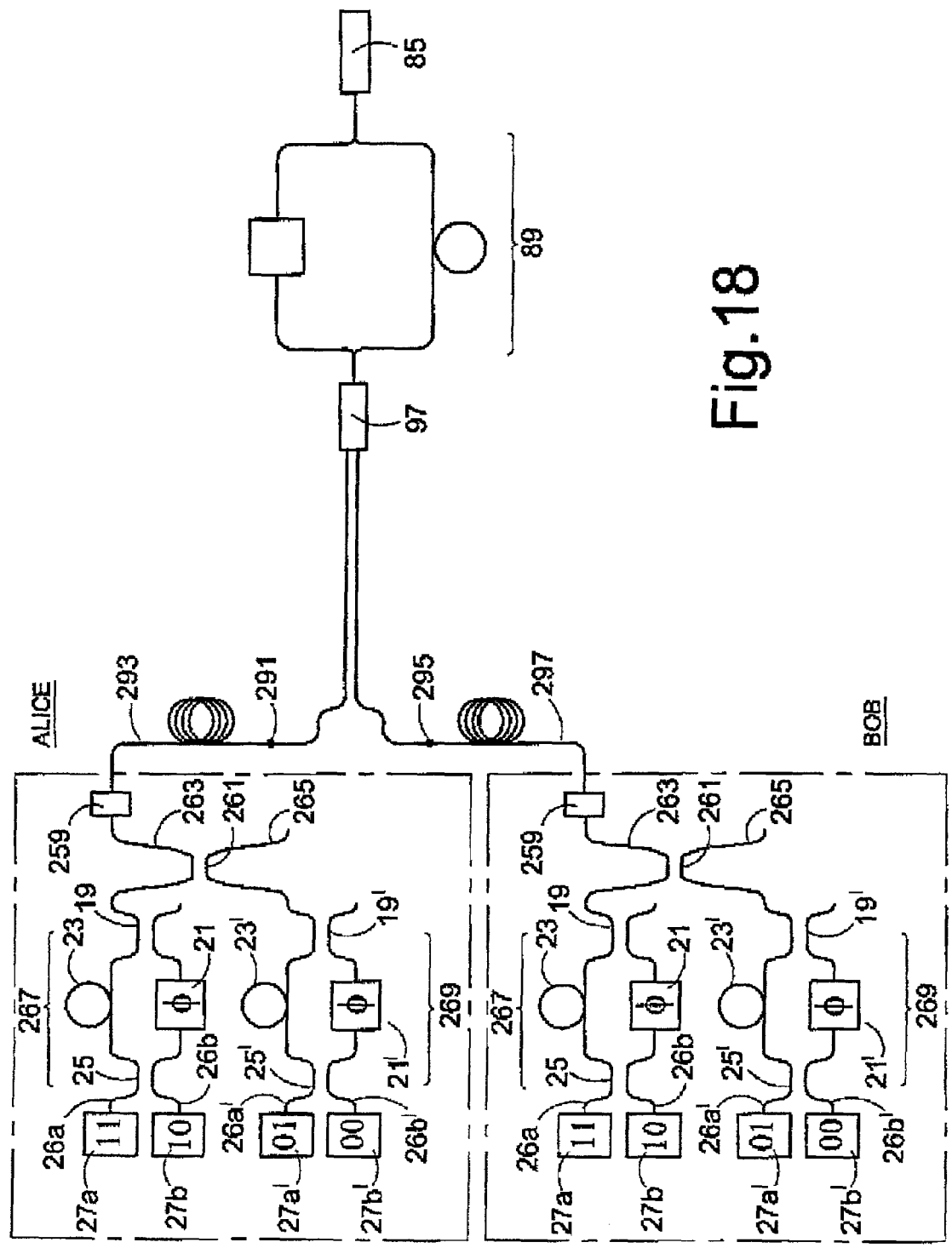
FIG. 18 shows a variation on the apparatus of FIG. 16.

FIG. 18 shows a further variation on the apparatus of FIGS. 16 and 17 used to perform the method described in relation to FIG. 15. The apparatus of FIG. 18 is largely based on the entangled photon apparatus of FIG. 7.

The polarisation entangled source comprises a source 85 which is a single photon source emits single equally spaced apart photons or a laser diode which is attenuated to the level that one pulse in ten contains a photon. A photon from laser 85 passes into interferometer 89 and en into non-linear material 97 to generate an entangled phase and polarisation photon pair. Entangled photon pairs are always polarisation entangled. However, they are not phase entangled unless the type of apparatus shown in FIG. 18 is used The entangled photon source is described in more detail with reference to FIG. 7, Like reference numerals have been used to denote like features. One photon 291 is divided down cable 293 to Alice and the other photon 295 down cable 297 to Bob. Alice and Bob's receivers are identical to the receiver described with reference to FIG. 18.

However, it should be noted that in this example which uses entangled photons, a measurement of one of the photons affects the other. Rotating the polarisation of the photon carried down either of fibres 293 or 297 affects the polarisation state of the photon in the other fibre. Therefore, Alice can determine the polarisation of the photon which Bob receives and similarly Bob can determine the polarisation of the photon which Alice receives.

Similarly, any phase shift put on the photon by Alice using phase modulators 21 and 21' (these modulators should be driven together) will affect the phase of a photon in Bob's receiver and vice versa.

If there is 180° phase shift between the phase modulation of Alice's receiver and Bob's receiver, then the photons will destructively interfere. However, if there is a 0° phase shift between Alice's phase modulators 21, 21' and Bob's modulators 21, 21' the photons will constructively interfere.

Figure 19:
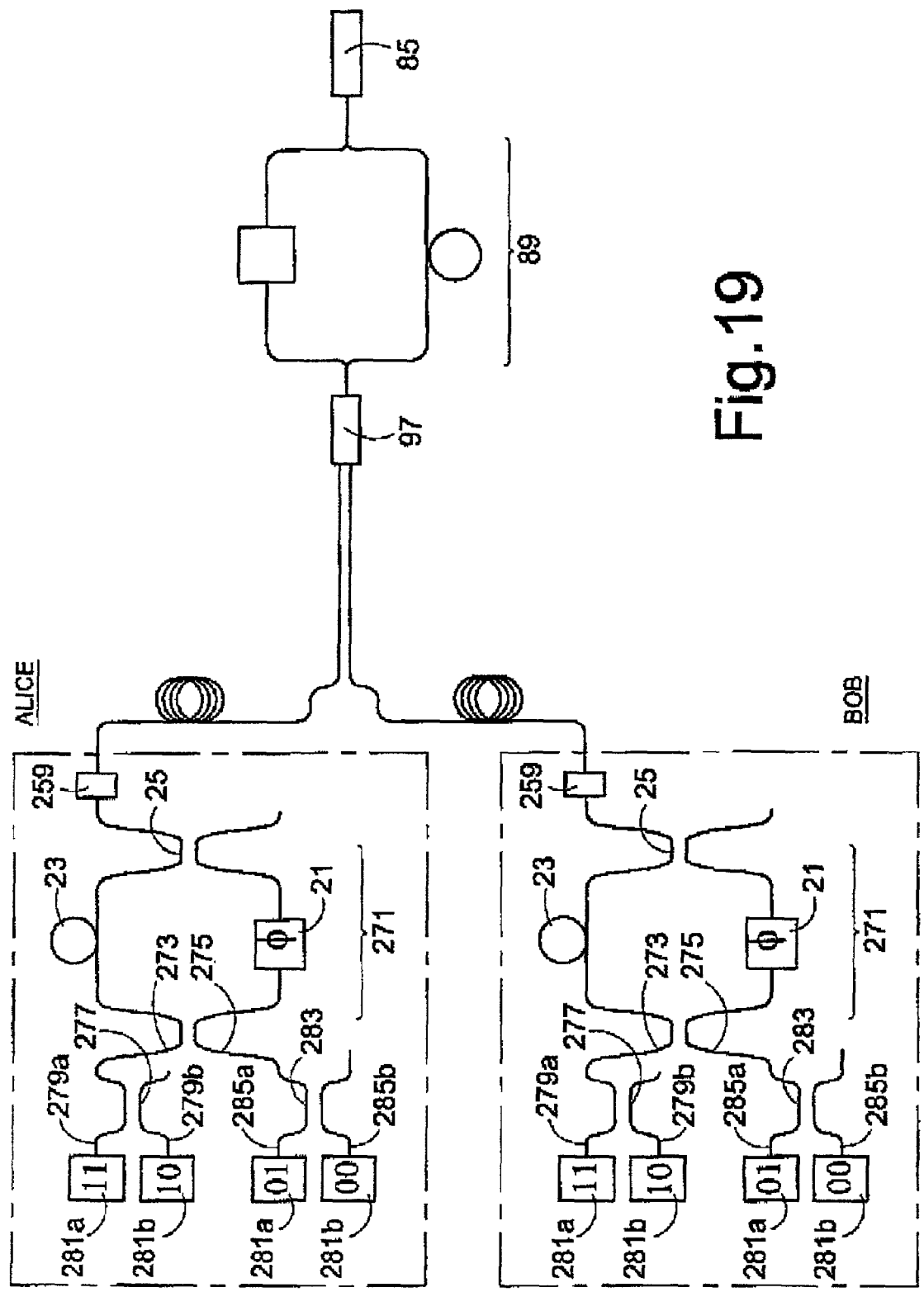
FIG. 19 shows a variation on the apparatus of FIG. 16.

FIG. 19 shows a yet further variation on the apparatus of FIG. 18. To avoid unnecessary repetition, like reference numerals will be used to denote features which perform the same function as those described in relation to FIG. 18. Alice's and Bob's receivers are identical to the receiver explained with reference to FIG. 17. The source is identical to that described with reference to FIG. 18.

Any of the apparatus described with reference to FIGS. 16 to 19 could also comprise a diffraction grating and a single photon detector array which would replace each single photon detector. Thus, each apparatus could also be used to measure he colour of the photons as described with reference to the apparatus shown in FIG. 10.

A method in accordance with a further embodiment of the present invention addresses the problem of eavesdropping where the eavesdropper uses an intermediate basis. The BB84 protocol which has been described with reference to FIG. 2 will be used here as an example.

As for example 2, there are two basis $\psi$ and $\phi$ each having two orthogonal states $\alpha$, $\beta$. $\alpha$ equals 0, $\beta$ equals 1 and 1 bit is transmitted per photon. The two states in each basis are orthogonal but the states from one basis are not orthogonal to the states in the other basis.

In the previous cases, Eve has randomly chosen between measuring in basis $\psi$ or basis $\phi$. However, here, Eve chooses to listen in a basis $\theta$, the states in basis $\theta$ are not orthogonal to the states in basis $\psi$ or basis $\phi$.

Figure 20:
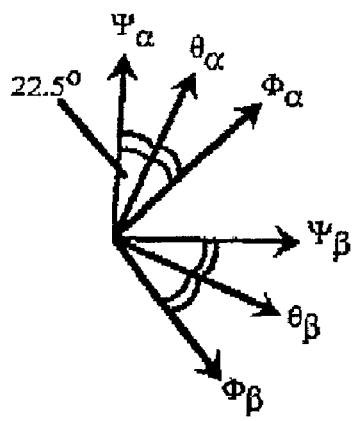
FIG. 20 schematically demonstrates the known use of an intermediate basis for eavesdropping in the BB84 protocol.

$\theta$ is derived such that $|(\theta_i|\psi_j)|^2 = |(\theta_i|\theta_j)|^2 = P_{max}$ $|(\theta_i|\psi_j)|^2 = |(\theta_i|\phi_j)|^2 = P_{min}$ $\theta_\alpha = C(\psi_\alpha + \phi_\alpha)$ $\theta_\beta = C'(\psi_\beta + \phi_\beta)$ $\theta_\alpha = \frac{1}{\sqrt{2}\sqrt{2+\sqrt{2}}}\left((1+\sqrt{2})\psi_\alpha + \psi_\beta\right) = \frac{1}{\sqrt{2}\sqrt{2+\sqrt{2}}}\left((1+\sqrt{2})\phi_\alpha - \phi_\beta\right)$ $\theta_\beta = \frac{1}{\sqrt{2}\sqrt{2+\sqrt{2}}}\left((1+\sqrt{2})\psi_\beta + \psi_\alpha\right) =$ $\frac{1}{\sqrt{2}\sqrt{2+\sqrt{2}}}\left((1+\sqrt{2})\phi_\beta + \phi_\alpha\right)$ -continued $|(\theta_i|\psi_j)|^2 = |(\theta_i|\phi_j)|^2 = P_{max} = \frac{3+2\sqrt{2}}{2(2+\sqrt{2})}$ $|(\theta_i|\psi_j)|^2 = |(\theta_i|\phi_j)|^2 = P_{min} = \frac{1}{2(2+\sqrt{2})}$ In this example, the $\psi$ and $\phi$ states are 45° apart the $\theta$ basis is chosen at an angle of 22.5° from both states. This is shown in FIG. 20.

By listening in this intermediate basis, Eve introduces errors at the same rate as for conventional eavesdropping (25%). However, she gains more information about the key. The measure of the information gained is called "Shannon information". For normal eavesdropping, the Shannon information is 0.5. However, for intermediate eavesdropping, it rises to approximately 0.6. With conventional eavesdropping, Eve has a key which is 75% of the bits statistically correct, with intermediate eavesdropper, she has a key with roughly 85% of the bits statistically correct.

The method of this embodiment attempts to guard against Eve using an intermediate basis. This embodiment uses more than 2 bases to send the information.

Figure 21:
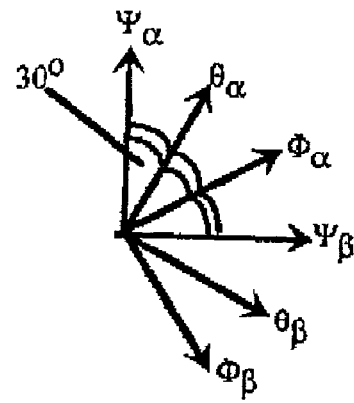
FIG. 21 is a schematic of tree polarisation bases which can be used for communication in accordance with a further embodiment of the present invention.

In the specific example shown in FIG. 21, Alice and Bob agree on three different bases to send the information, $\psi$, $\theta$ and $\phi$. Each basis has two orthogonal states $\alpha$ and $\beta$. Each basis is rotated by 30° from its adjacent basis. Using normal eavesdropping, i.e. using one of the tree bases, Eve only has a probability of obtaining the correct data of a third. She will also introduce an error at a rate of 25%. As statistically she knows two third of the key (c.f. ¾ with two bases), this method reduces the information Eve gains whilst maintaining the same security.

Figure 22:
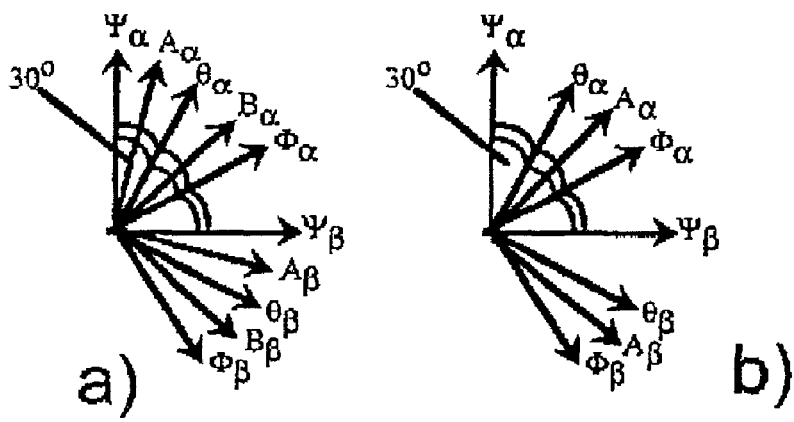
FIG. 22a is a schematic demonstrating how an eavesdropper could use two intermediate bases to try and intercept a message sent using the bases illustrated in FIG. 21
FIG. 22b is a schematic showing how an eavesdropper could use a single intermediate basis to try to gain information about a key sent using the three bases of FIG. 21.

If Eve wishes to gain more information, she can listen in either of the two intermediate basis a and b (as shown in FIG. 22a). Here, she uses either basis a which is directly interposed between basis $\psi$ and $\phi$ or basis b which is directly interposed between $\theta$ and $\phi$.

Using this method, Eve introduces errors at a higher rate (31.25%) and she knows only 72% of the key statistically. Her Shannon information is 0.677. Therefore, this key distribution method is more secure as it increases the error rate which Eve introduces whilst reducing the information gain. For example, if Eve only listened to 80% of the key, she will still introduce errors into 25% of the key and reduce her Shannon information to only 0.54 and her statistical knowledge to 57.6% of the key. Eve could also use the method shown in FIG. 16b where she chooses just one intermediate basis a which is equidistant between basis $\theta$ and $\phi$. Using this basis, she maintains the rate of error introduction at 25%. However, her Shannon information is reduced to 0.57 and she only knows 79% of the key statistically.

The above two described methods both increase security from the straight BB84 method described with reference to FIG. 2 as either Eve's knowledge of the key is reduced or her rate of error introduction is increased, thus making her easier to detect.

The example could be extended to using four or more intermediate basis. Also, this method could be used in conjunction with using an additional classical parameter as described with reference to FIGS. 8 to 14 or with using two quantum parameters as described with reference to FIGS. 15 to 19. Combining all three embodiments is also possible.

The apparatus required to achieve the above method is identical to that described with reference to FIGS. 4 to 7, 10 to 14 and 16 to 19. The apparatus would need to be capable of switching between at least three measuring basis. Where a polarisation rotator is provided, this can be configured to rotate the polarisation through two angles in addition to providing no change in the polarisation angle, thus, the measurement basis could be randomly selected as before.

A method has been described with reference to using the polarisation. However, it could also be used for phase as, in the known method of using phase, two bases are effectively used, one where the phase can equal 0° or 180° and the other where the phase can be by 90° or 270°. In this specific example, Eve could listen at an intermediate basis having a phase shift of 45°. To combat this, Alice and Bob could decide to use three basis, the first having a phase shift of 0° or 180°, the second having a phase shift of 60° or 240° and the third having a phase shift of 120° and 300°.

A further embodiment of the present invention also provides a communication method which increases the rate at which Eve introduces errors into the key.

Alice transmits to Bob a stream of photons which is encoded with the information in accordance with any of the previous examples, both those of the prior art and those described with reference to FIGS. 4 to 19. For simplicity, it would be presumed that Bob and Alice are using the BB84 protocol described with reference to FIG. 2.

However, B92, entangled photon methods or any of the techniques described to counter intermediate eavesdropping and to add extra bits (either quantum or classical) to the key could be used.

Figure 23:
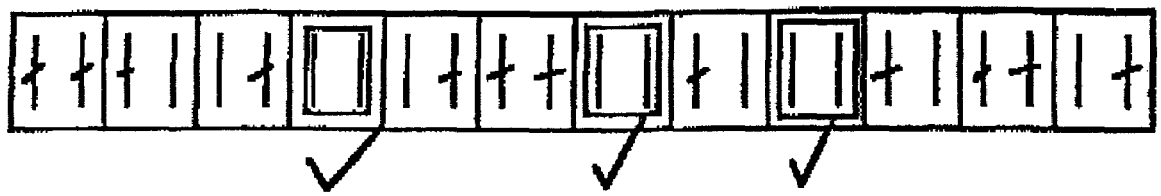
FIG. 23 show schematically how photons or the results of measurements of photons may be grouped in order to emphasise the presence of an eavesdropper in accordance with a further embodiment of the present invention.

In the traditional manner for BB84, Alice tells Bob which basis she used for each photon and Bob tells Alice which results to keep the key, A typical set of results is shown in FIG. 23. FIG. 23 shows a key before the measurement or results are compared. In the example shown in FIG. 23, Alice and Bob decide to group tee photons into sets of m photons where here, m=2. In the specific example of FIG. 23, 24 photons are sent, photons which are measured in the incorrect basis have been crossed through in he figure. Alice and Bob group the photons into twos and discard any pairs of photons where both photons in the group were not measured in the correct basis. On average, this means that only one in four of the photon pairs are retained.

By grouping the photons into these "macro bits" of length m, any eavesdropping by Eve shows up more easily. To elucidate this point further, consider the extreme case where the whole key length is used as a macro bit The probability of Eve having eavesdropped without causing an error in each of the photons or bits is 0.75. Therefore, the probability of her not causing an error in the whole key of m bits is $0.75^m$.

Therefore, in the specific example of FIG. 23, the probability of Eve having not caused an error in a chosen macro bit is $0.752^2$. As more of the key is thrown away, the rate of key transmission is a $\frac{1}{2}^m$ of that standard BB84.

When the photons are combined in bi-bits and the probability of a bi-bit being incorrect due to eavesdropping is = $[1-(0.75)^2]=43.75\%$ (assuming that Eve listens to all photons transmitted). In the general case where the m photon co bit, the error is $1-0.75^m$. The value of m may be agreed beforehand or after. It is probably advantageous to agree the value of m after the transmission so that Eve cannot develop some clever eavesdropping strategy when she discovers the value of m prior to transmission.

What is claimed is:

1. A method of encoding at least two bits of information on a single photon, the method comprising the step of setting at least two parameters of the photon to respectively correspond to the at least two bits of information such that the at least two bits of information are encoded onto the photon using the at least two parameters.

2. The method of claim 1, wherein the at least two parameters are chosen from polarisation, phase or time/energy of the photon defined as quantum parameters or polarisation, phase or color defined as classical parameters.

3. The method of claim 1, wherein one parameter defined as a quantum parameter of the photon and the other parameter is defined as a classical parameter.

4. The method of claim 1, wherein the wavelength which is defined as a classical parameter is used to encode information on the photon and the photon can occupy one of n different values of wavelength, wherein n is an integer of at least 2.

5. The method of claim 1, wherein a parameter is defined as a quantum parameter and the photon occupies one of the four states $\psi_\alpha$, $\psi_\beta$, $\phi_\alpha$ and $\phi_\beta$ with respect to that parameter, the four states forming two bases $\psi$ and $\phi$ such that:

$$\langle \psi_i | \psi_j \rangle = \langle \phi_i | \phi_j \rangle = \delta_{i,j}$$

wherein each of the indices i,j can be $\alpha$ or $\beta$.

6. The method of claim 5, wherein:

$$|\langle \psi_i | \phi_j \rangle|^2 = \frac{1}{2}.$$

7. The method of claim 1, wherein a parameter is defined as a quantum parameter and the photon occupies one of two distinct non-orthogonal states $|u_0\rangle$ and $|u_1\rangle$ with respect to that parameter, wherein there exists operators $P_0=1-|u_1\rangle\langle u_1|$ and $P_1=1-|u_0\rangle\langle u_0|$ such that $P_0$ annihilates $1u_1\rangle$ and yields a positive result with probability $1-|\langle u_0|u_i\rangle|^2>0$ when applied to $|u_0\rangle$ and $P_1$ annihilates $|u_0\rangle$ and yields a positive result with a probability of $1-|\langle u_i|u_0\rangle|^2>0$ when applied to $u_1$.

8. The method of claim 4, wherein at least one other parameter is defined as a quantum parameter and the photon also occupies one of the four states $\theta_\alpha$, $\theta_\beta$, $\chi_\alpha$ and $\chi_\beta$ with respect to that parameter, the four States forming two basis $\theta$ and $\chi$ such that $$\langle \theta_i | \theta_j \rangle = \langle \chi_i | \chi_j \rangle = \delta_{i,j}$$

wherein each of the indices i,j can be $\alpha$ or $\beta$.

9. The method of claim 4, wherein at least one other parameter is configured as a quantum parameter and the photon also occupies one of two distinct non-orthogonal states $|w_0\rangle$ and $|w_1\rangle$ with respect to that parameter, wherein there exists operators $R_0=1-|w_1\rangle\langle w_1|$ and $R_1=1-|w_0\rangle\langle w_0|$ such that $R_0$ annihilates $|w_1\rangle$ and yields a positive result with probability $1-|\langle w_0|w_1\rangle|^2>0$ when applied to $|w_0\rangle$ and $R_1$ annihilates $|w_0\rangle$ and yields a positive result with a probability of $1-|\langle w_1|w_0\rangle|^2>0$ when applied to $w_1$.

10. The method of claim 1, wherein at least two parameters configured as quantum parameters and at least one parameter configured as a classical parameter are used to encode information on the photon.

11. The method of claim 1, wherein the photon is generated as one of an entangled photon pair and the parameters of the photon configured as quantum parameters are set by measuring the quantum parameters of the other photon of the entangled photon pair.

12. A decoding method for decoding at least two bits of information from a single photon, the method comprising the step of measuring at least two parameters of the photon that respectively correspond to the at least two bits of information such that the at least two bits of information are decoded from the photon using the at least two parameters.

13. A communication method for communicating information between a first site and a second site using a stream of single photons, the method comprising:
   a) encoding information at the first site on each photon of the stream of photons using at least two parameters in accordance with claim 1, wherein at least one of the parameters is configured as a quantum parameter chosen such that the photon occupies one basis state with respect to that parameter, wherein the basis state is chosen from n bases which are non-orthogonal to one another and where n is an integer of at least two;
   b) measuring the at least two parameters of the photons received at the second site wherein the quantum parameter is measured using a randomly chosen measurement basis from n non-orthogonal measurement bases, wherein each basis corresponds to a basis of step (a); and
   c) communicating between the first and second sites to establish which photons were measured using the correct basis.

14. The communication method of claim 13, wherein step a) comprises the step of setting at least two parameters of the photon such that information is encoded onto the photon using the at least two parameters, wherein the wavelength which is defined as a classical parameter is used to encode information on the photon and the photon can occupy one of n different values of wavelength, wherein n is an integer of at least 2, the method further comprising discarding the results from photons which were measured using an incorrect basis.

15. The communication method of claim 13, wherein the basis state is chosen from n bases and two orthogonal basis states in each basis.

16. The communication method of claim 13, wherein the basis state is chosen from n bases and only one basis state be chosen in each basis.

17. The communication method of claim 13, wherein step (a) comprises the step of setting the wavelength of the photon to encode information on the photons and step b) comprises the step of directing the photons onto a dispersive element in order to determine their wavelength.

18. A communication method for communicating information between a first site and a second site using a stream of single photons, the method comprising the steps of:
   a) encoding information at the first site on the photons by selectively setting a parameter of each photon defined as a quantum parameter such that each photon occupies one basis state with respect to that parameter, wherein the basis state is chosen from n non-orthogonal bases and n is an integer of at least three;
   b) measuring the photons received at the second site wherein the quantum parameter is measured using a randomly chosen measurement basis from n non-orthogonal measurement bases, wherein each basis corresponds to a basis of step (a); and
   c) communicating between the first and second sites to establish for which photons the correct type of measurement was used.

19. The method of claim 18, wherein the polarisation state of the photon is chosen from m bases, each basis having two orthogonal states, wherein each basis is offset by 90°/m from its nearest basis.

20. The method of claim 18, the phase of the photon is chosen from m basis states, wherein each basis is offset by 180°/m from its neighbouring basis.

21. The method of claim 18, wherein the color of the photon is also set in order to encode information.

22. The method of claim 18, wherein the at least three non-orthogonal bases comprise pairs of states $\Psi_\alpha, \Psi_\beta$ such that:

$$\langle \psi_i | \psi_j \rangle = \delta_{i,j}$$

wherein each of the indices i,j can be $\alpha$ or $\beta$.

23. The communication method of claim 18, wherein the basis state is chosen from n bases and two orthogonal basis states in each basis.

24. The communication method of claim 18, wherein the basis state is chosen from n bases and only one basis state can be chosen in each basis.

25. A communication method for communicating information between a first site and a second site using a stream of single photons, the method comprising the steps of:
   a) encoding information at the first site on the photons by selectively setting a parameter of each photon defined as a quantum parameter such that each photon occupies one basis state with respect to that parameter, wherein the basis state is chosen from n non-orthogonal bases and n is an integer of at least two;
   b) measuring the photons received at the second site wherein the quantum parameter is measured using a randomly chosen measurement basis from n non-orthogonal measurement bases, wherein each basis corresponds to a basis of step (a);
   c) grouping the measured photons into groups of m photons and m is an integer of at least two;
   d) communicating between the first and second sites to establish for which groups of photons the correct type of measurement was used for all photons in the group;
   e) discarding the results from an entire group of photons if at least one photon from the group of photons was not correctly measured in step (b) such that only the results from groups of photons where all photons in a group were correctly measured are retained; and
   f) comparing both the type of measurement and the results of the measurement for all photons in at least one of the retained groups of photons.

26. The communication method of claim 25, wherein the basis state is chosen from n bases and two orthogonal basis states in each basis.

27. The communication method of claim 25, wherein the basis state is chosen from n bases and only one basis state can be chosen in each basis.

28. The communication method of claim 25, wherein the value of M varies along the stream of photons.

29. The communication method of claim 25, wherein the value of M is decided after step (b).

30. The communication method of claim 25, wherein n is an integer of three or more.

31. The communication method of claim 25, wherein information is encoded on the photon using at least two parameters in step (a).

32. An encoding apparatus for encoding at least two bits of information on a photon, the apparatus comprising encoding means for variably setting at least two parameters of the photon to respectively correspond to the at least two bits of information such that the at least two bits of information can be encoded onto the photon using the at least two parameters.

33. The apparatus of claim 32, wherein the encoding means comprises a polarisation rotator configured to rotate the plane of polarisation of a photon to one of a set of predetermined orientations.

34. The apparatus of claim 33, further comprising a random number generator coupled to the polarisation rotator, such that the polarisation of the photon is random.

35. The apparatus of claim 32, wherein the encoding means comprises a phase modulator, configured to shift the phase of the photon by a phase shift chosen from a set of predetermined phase shifts.

36. The apparatus of claim 35, wherein a random number generator is coupled to the phase modulator, such that the phase shift applied to the photon is random.

37. The apparatus of claim 33, wherein the encoding me comprises a photon generator capable of emitting a photon having one of at least two predetermined wavelengths.

38. A decoding apparatus for decoding at least two bits of information encoded on a single photon, the apparatus comprising measuring means for measuring at least two parameters of the photon that respectively correspond to the at least two bits of information such that the at least two bits of information are decoded from the photon using the at least two parameters.

39. The decoding apparatus of claim 38, wherein the measuring means comprises means to measure the polarisation of the photon.

40. The decoding apparatus of claim 38, wherein the measuring means comprises an interferometer.

41. The decoding apparatus of claim 38, wherein the measuring means comprises a dispersive element.

42. A communication apparatus comprising:
   an encoding apparatus. located at a first site, for encoding at least two bits of information on a photon, the apparatus comprising encoding means for variably setting at least two parameters of the photon to respectively correspond to the at least two bits of information such that the at least two bits of information can be encoded onto the photon using the at least two parameters;
   a decoding apparatus located at a second site, for decoding the at least two bits of information encoded on the photon, said decoding apparatus comprising measuring means for measuring the at least two parameters of the photon that respectively correspond to the at least two bits of information such that the at least two bits of information are decoded from the photon using the at least two parameters;
   a link configured to carry single photons to and from the first and second sites; and
   a classical unjammable link between the first and second sites configured to carry information between the two sites.

43. The communication apparatus of claim 42, wherein photons are encoded and sent from the first site to the second site.

44. The communication apparatus of claim 42, wherein the photons are generated as entangled photon pairs such that measuring one photon of a pair serves to encode the other photon of the pair, the apparatus being configured such that the first site receives one of the pair and the second site receives the other of the pair.

45. A communication apparatus comprising:
   an encoding apparatus located at a first site for encoding information on a photon comprising: encoding means configured to set a quantum parameter chosen from the polarisation, phase or energy/time of the photon, such that the photon occupies one basis state chosen from at least three non-orthogonal bases with respect to the chosen parameter;
   a decoding apparatus located at a second site, for decoding information encoded on a single photon, wherein information is encoded onto the single photon by setting one parameter defined as a quantum parameter chosen from the phase, polarisation or energy/time of the photon, such that the photon occupies a basis state chosen from one of n non-orthogonal bases with respect to his parameter where n is an integer of at least three, the decoding apparatus comprising decoding means configured to measure the photons using a randomly chosen measuring basis from n bases which correspond to the bases used to encode the photon;
   means configured to carry single photons; and
   a classical link between the first and second sites configured to carry information between the two sites.

46. The apparatus of claim 45, wherein the encoding means comprises a polarisation rotator configured to rotate the plane of polarisation of a photon to one of a set of at least three mutually non-orthogonal predetermined orientations.

47. The apparatus of claim 46, further comprising a random number generator coupled to the polarisation rotator, such that the polarisation of the photon is at least partially random.

48. The apparatus of claim 45, wherein the encoding means comprises a phase modulator, configured to shift the phase of the photon by a phase shift chosen from a set of predetermined phase shifts.

49. The apparatus of claim 48, wherein a random number generator is coupled to the phase modulator, such that the phase shift applied to the photon is at least partially random.

50. The apparatus of claim 45, wherein the encoding means comprises a photon generator capable of emitting a photon having one of at least two predetermined wavelengths.

51. The decoding apparatus of claim 45, wherein the measuring means comprises means to measure the polarisation of the photon.

52. The decoding apparatus of claim 45, wherein the measuring means comprises an interferometer.

53. The decoding apparatus of claim 45, wherein the measuring means comrises a dispersive element.

54. The communication apparatus of claim 45, wherein photons are encoded and sent from the first site to the second site.

55. The communication apparatus of to claim 45, wherein the photons are generated as entangled photon pairs such that measuring one photon of a pair serves to encode the other photon of the pair, the apparatus being configured such that the first site receives one of the pair and the second site receives the other of the pair.

* * * * *